United States Patent
Oh et al.

(10) Patent No.: US 12,099,801 B2
(45) Date of Patent: Sep. 24, 2024

(54) ANSWER CLASSIFIER AND REPRESENTATION GENERATOR FOR QUESTION-ANSWERING SYSTEM USING GAN, AND COMPUTER PROGRAM FOR TRAINING THE REPRESENTATION GENERATOR

(71) Applicant: National Institute of Information and Communications Technology, Tokyo (JP)

(72) Inventors: Jonghoon Oh, Tokyo (JP); Kazuma Kadowaki, Tokyo (JP); Julien Kloetzer, Tokyo (JP); Ryu Iida, Tokyo (JP); Kentaro Torisawa, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 369 days.

(21) Appl. No.: 17/622,798

(22) PCT Filed: Jul. 6, 2020

(86) PCT No.: PCT/JP2020/026360
§ 371 (c)(1),
(2) Date: Dec. 25, 2021

(87) PCT Pub. No.: WO2021/014951
PCT Pub. Date: Jan. 28, 2021

(65) Prior Publication Data
US 2022/0253599 A1 Aug. 11, 2022

(30) Foreign Application Priority Data
Jul. 19, 2019 (JP) .................... 2019-133710

(51) Int. Cl.
*G06F 40/20* (2020.01)
*G06F 16/2455* (2019.01)
(Continued)

(52) U.S. Cl.
CPC .............. *G06F 40/20* (2020.01); *G06F 16/35* (2019.01); *G06F 40/30* (2020.01)

(58) Field of Classification Search
CPC ................................................. G06F 16/2455
See application file for complete search history.

(56) References Cited

U.S. PATENT DOCUMENTS 10,983,971 B2 * 4/2021 Carvalho ............ G06F 16/2455
2018/0246953 A1 8/2018 Oh
(Continued)

FOREIGN PATENT DOCUMENTS

CN 114970513 * 8/2022 ............. G06N 3/045
JP 2017-049681 A 3/2017
(Continued)

OTHER PUBLICATIONS

International Search Report for corresponding Application No. PCT/JP2020/026360, mailed Sep. 24, 2020.
(Continued)

*Primary Examiner* — Farzad Kazeminezhad
(74) *Attorney, Agent, or Firm* — Renner, Otto, Boisselle & Sklar, LLP

(57) ABSTRACT

A program for training a representation generator generating a representation representing an answer part included in a passage to classify whether the passage is related to an answer or not. The program causes a computer to operate as: a fake representation generator responsive to a question and a passage for outputting a fake representation representing an answer part of the passage; a real representation generator for outputting, for the question and a core answer, a real
(Continued)

representation representing the core answer, in the same format as fake representation; a discriminator for discriminating whether fake representation and real representation are a real or fake representation; and a generative adversarial network unit training the discriminator and fake representation generator through generative adversarial network such that error determination of fake representation is maximized and error determination of real representation is minimized.

5 Claims, 19 Drawing Sheets

(51) Int. Cl.
 *G06F 16/35* (2019.01)
 *G06F 40/30* (2020.01)

(56) References Cited

U.S. PATENT DOCUMENTS

| | | | |
|---|---|---|---|
| 2020/0134263 | A1 | 4/2020 | Oh |
| 2020/0226475 | A1* | 7/2020 | Ma .......................... G06F 40/30 |

FOREIGN PATENT DOCUMENTS

| | | |
|---|---|---|
| JP | 2019-046019 A | 3/2019 |
| WO | 2019/012908 A1 | 1/2019 |

OTHER PUBLICATIONS

Jong-Hoon Oh et al., "Open-Domain Why-Question Answering with Adversarial Learning to Encode Answer Texts", Proceedings of the 57th Annual Meeting of the Association for Computational Linguistics, pp. 4227-4237, Florence, Italy, Jul. 28-Aug. 2, 2019.

Suzan Verberne et al., "What is not in the Bag of Words for Why-QA?", Association for Computational Linguistics, pp. 229-245, 2010.

Jong-Hoon Oh et al., "Why Question Answering using Sentiment Analysis and Word Classes", Proceedings of the 2012 Joint Conference on Empirical Methods in Natural Language Processing and Computational Natural Language Learning, pp. 368-378, Jeju Island, Korea, Jul. 12-14, 2012.

Jong-Hoon Oh et al., "Why-Question Answering using Intra- and Inter-Sentential Causal Relations", Proceedings of the 51st Annual Meeting of the Association for Computational Linguistics, pp. 1733-1743, Sofia, Bulgaria, Aug. 4-9, 2013.

Jong-Hoon Oh et al., "A Semi-Supervised Learning Approach to Why-Question Answering", 2016, Association for the Advancement of Artificial Intelligence, pp. 3022-3029.

Jong-Hoon Oh et al., "Multi-col. Convolutional Neural Networks with Causality-Attention for Why-Question Answering", WSDM 2017, Feb. 6-10, 2017, Cambridge, United Kingdom, pp. 415-424.

* cited by examiner

FIG. 2

| QUESTION | Why does honey last a long time? |
|---|---|
| ANSWER PASSAGE (POSITIVE EXAMPLE) | While excavating Egypt's pyramids, archaeologists have found pots of honey in an ancient tomb: thousands years old, and yet still preserved. Honey can last a long time due to three special properties. The average pH of honey is 3.9, which is quite acidic. Such high level of acidity is certainly hostile and hinders the growth of many microbes. Though honey contains around 17-18% water, its water activity is too low to support the growth of microbes. Moreover honey contains hydrogen peroxide thought to help prevent the growth of microbes in honey. Despite these properties, honey can be contaminated under certain circumstances. |

FIG. 3

| QUESTION | Why does honey last a long time? |
|---|---|
| ANSWER PASSAGE (POSITIVE EXAMPLE) | While excavating Egypt's pyramids, archaeologists have found pots of honey in an ancient tomb: thousands years old, and yet still preserved. <u>Honey can last a long time due to three special properties.</u> The average pH of honey is 3.9, which is quite acidic. Such high level of acidity is certainly hostile and hinders the growth of many microbes. Though honey contains around 17-18% water, its water activity is too low to support the growth of microbes. Moreover honey contains hydrogen peroxide thought to help prevent the growth of microbes in honey. Despite these properties, honey can be contaminated under certain circumstances. |

FIG. 4

| QUESTION | Why does honey last a long time? |
|---|---|
| ANSWER PASSAGE (NEGATIVE EXAMPLE) | Honey is a natural substance produced by bees from the nectar or secretions of plants. It is made up of approximately 80% sugar and 18% water. It also contains trace amounts of organic acids, amino acids, minerals, enzymes, and vitamins. Honey is typically highly acidic due to the organic and amino acids. <u>Many people have heard of pots of honey found in an Egypt's ancient tomb, and still perfectly edible. These stories have led many people to believe that honey simply can last forever</u>. <u>However, if honey is stored incorrectly, it can become contaminated with microbes.</u> |

FIG. 5

| QUESTION | Why does honey last a long time? | |
|---|---|---|
| ANSWER PASSAGE (POSITIVE EXAMPLE) | While excavating Egypt's pyramids, archaeologists have found pots of honey in an ancient tomb: thousands years old, and yet still preserved. <u>Honey can last a long time due to three special properties</u>. The average pH of honey is 3.9, which is quite acidic. <u>Such high level of acidity is certainly hostile and hinders the growth of many microbes</u>. Though honey contains around 17-18% water, <u>its water activity is too low to support the growth of microbes</u>. <u>Moreover honey contains hydrogen peroxide thought to help prevent the growth of microbes in honey</u>. Despite these properties, honey can be contaminated under certain circumstances. | ~90<br>~92<br>~96 |
| MANUALLY PREPARED CORE ANSWER | Because its acidity, low water activity, and hydrogen peroxide together hinder the growth of microbes | ~110 |

FIG. 13

| METHOD | P@1 | MAP |
|---|---|---|
| OH17 | 47.6 | 45.0 |
| BASE | 51.4 | 50.4 |
| BASE+AddTr | 52.0 | 49.3 |
| BASE+CAns | 51.8 | 50.3 |
| BASE+CEnc | 52.4 | 51.5 |
| BASE+Enc | 52.2 | 50.6 |
| BERT | 51.2 | 50.8 |
| BERT+AddTr | 51.8 | 51.0 |
| BERT+AGR | 53.4 | 51.2 |
| Proposed | 54.8 | 52.4 |

FIG. 14

| METHOD | P@1 | MAP |
|---|---|---|
| OH17 | 47.6 | 45.0 |
| BASE | 51.4 | 50.4 |
| BASE+AddTr | 52.0 | 49.3 |
| BASE+CAns | 51.8 | 50.3 |
| BASE+CEnc | 52.4 | 51.5 |
| BASE+Enc | 52.2 | 50.6 |
| BERT | 51.2 | 50.8 |
| BERT+AddTr | 51.8 | 51.0 |
| BERT+AGR | 53.4 | 51.2 |
| Proposed | 54.8 | 52.4 |

| METHOD | P@1 | MAP |
|---|---|---|
| OH17 | 47.6 | 45.0 |
| BASE | 51.4 | 50.4 |
| BASE+AddTr | 52.0 | 49.3 |
| BASE+CAns | 51.8 | 50.3 |
| BASE+CEnc | 52.4 | 51.5 |
| BASE+Enc | 52.2 | 50.6 |
| BERT | 51.2 | 50.8 |
| BERT+AddTr | 51.8 | 51.0 |
| BERT+AGR | 53.4 | 51.2 |
| Proposed | 54.8 | 52.4 |

554, 558

| METHOD | P@1 | MAP |
|---|---|---|
| BASE | 51.4 | 50.4 |
| PROPOSED (RV) | 54.6 | 51.8 |
| PROPOSED (RP) | 53.4 | 51.5 |
| PROPOSED | 54.8 | 52.4 |

ANSWER CLASSIFIER AND REPRESENTATION GENERATOR FOR QUESTION-ANSWERING SYSTEM USING GAN, AND COMPUTER PROGRAM FOR TRAINING THE REPRESENTATION GENERATOR

TECHNICAL FIELD

The present invention relates to a question-answering system and, more specifically, to an answer classifier used in a question-answering system for extracting passages possibly including answers from a text archive in response to a question input in a natural language, for classifying the passages to those including and those not including correct answers, a representation generator used in the answer classifier, and a computer program for training the representation generator. The present invention claims convention priority on Japanese Patent Application No. 2019-133710 filed on Jul. 19, 2019, and incorporates the entire description of this Japanese application by reference.

BACKGROUND ART

A why-question-answering system using natural language processing is disclosed in Patent Literature 1 as listed below. FIG. 1 shows a schematic configuration of the why-type question-answering system 30. Different from a what-type (factoid-type) question-answering system, in a why-type question-answering system, it is typical to extract a plurality of passages consisting of a set of sentences having high possibility of being an answer (hereinafter referred to as a passage group; each passage includes five to seven sentences) from a text archive and to select the one most appropriate as an answer among them. Here, a passage refers to a plurality of continuous sentences in text. The why-type question-answering system 30 is of this type, and as a premise, it utilizes an answer candidate retrieving system 34 that extracts, upon receiving a question, a plurality of passages having high possibility of including a correct answer to the question from a text archive and outputs them.

Referring to FIG. 1, why-type question-answering system 30 disclosed in Patent Literature 1 includes: a question receiving unit 50 responsive to a question 32 in a natural language speech, for transcribing the question into text and outputting the same; a response receiving unit 52 for applying the question text output from question receiving unit 50 to an existing answer candidate retrieving system 34 and for receiving a plurality of passages (answer passages) as answer candidates; and an answer passage storage unit 54 for storing the answer passages received by response receiving unit 52.

Why-type question-answering system 30 further includes: a web archive storage unit 56 for collecting a large amount of text on the Web beforehand and for storing them; and a causality expression extracting unit 58 for extracting expressions possibly representing causality relation from the web archive stored in web archive storage unit 56. A variety of causality expression extracting unit 58 may be incorporated. For a why-type question, an expression representing a causality relation plays an important role in extracting an answer. The system disclosed in Patent Literature 1 adopts such a mechanism that recognizes causality in answer passages by using a clue term such as "because" or causality patterns such as "A causes B."

Why-type question-answering system 30 further includes: a feature extracting unit 60 for extracting features for determining whether or not a passage is apt as an answer to a question 66, from each of the answer passages stored in answer passage storage unit 54, knowledge on causality extracted by causality expression extracting unit 58 and the transcription of question 66 received from question receiving unit 50; a convolutional neural network (hereinafter referred to as CNN) 62 trained in advance such that, upon receiving an answer passage to be processed and the features extracted by feature extracting unit 60 at the inputs, it computes a likelihood that the answer passage is apt as an answer to question 66 (probability that the question is likely to be a question eliciting the answer passage) is calculated as a score; and an answer candidate ranking unit 64 for ranking answer passages in accordance with the scores calculated for respective answer passages by CNN 62 and outputting that answer passage which has the highest score as an answer 36 to question 32.

Why-type question-answering system 30 converts question 32 into text by question receiving unit 50, and applies it to response receiving unit 52 and feature extracting unit 60. Response receiving unit 52 applies the text to answer candidate retrieving system 34. Answer candidate retrieving system 34 searches a text archive, not shown, for a group of passages having high possibility of including answers to the question, and applies it to response receiving unit 52. The group of passages is stored in answer passage storage unit 54.

In concurrence, causality expression extracting unit 58 extracts causality expressions from text on the web stored in a web archive storage unit 56 and applies them to feature extracting unit 60.

Feature extracting unit 60 extracts, for each of the plurality of passages stored in answer passage storage unit 54, predetermined features allowing determination as to whether the passage is apt as an answer to question 32, based on the passage, the transcribed question 66 and the causality expression stored in causality expression extracting unit 58. The features are applied to CNN 62. CNN 62 receives the features from feature extracting unit 60 and the passage to be processed stored in answer passage storage unit 54, calculates a score indicating whether the passage is apt as an answer to question 32, and outputs the score together with the passage.

Answer candidate ranking unit 64 ranks passages based on the scores calculated by CNN 62 for each passage stored in answer passage storage unit 54, and outputs the passage having the highest score as answer 36.

CITATION LIST

Patent Literature

PTL 1: JP2017-049681A

SUMMARY OF INVENTION

Technical Problem

For a why-type question, an apt answer may be a cause part of a causality expression having the question in its effect part. According to Patent Literature 1, a passage most appropriate as an answer can be extracted from the group of answer candidate passages extracted by response receiving unit 52 based on the causality expressions. Therefore, according to Patent Literature 1, it is possible to select more apt answer to a why-type question as compared with the conventional examples.

However, not only in the invention disclosed in Patent Literature 1 but also in various approaches, there is still a problem that each passage involves noise. This problem makes it difficult to correctly score each passage. Accordingly, there is still room for improvement in the method of correctly selecting a passage to be an answer from a group of passages.

By way of example, referring to FIG. 2, consider a question 90 "Why does honey last a long time?" To this question 90, an exemplary answer passage 92 is obtained. This answer passage 92 is considered to be a correct example (positive example).

FIG. 3 shows text fragments to be noted in answer passage 92 of FIG. 2. Referring to FIG. 3, this answer passage 92 includes an expression 94 "Honey can last a long time." This expression 94 indicates that the answer passage 92 has a relation with the question 90. Answer candidate retrieving system 34 focuses on such a text fragment and outputs a passage including that text fragment as an answer candidate. On the other hand, an underlined text fragment 96 of answer passage 92 is considered to be related to an answer to the question. Text fragments except for expression 94 and not underlined are not directly related to the question 90. These text fragments are noises.

By contrast, while an answer passage 100 shown in FIG. 4 has a text fragment 102 related to question 90, other text fragments, particularly those underlined 104 are not related to the question nor to the answer. These text fragments are similar to the noises in the positive example. Such a passage that has no text fragment related to the answer to the question should be discarded.

In the why-type question-answering system, it is necessary to select from the group of passages a passage a large part of which is related to the answer. For this purpose, it is necessary to correctly determine whether a passage has many text fragments related to the answer with high probability.

Therefore, an object of the present invention is to provide an answer classifier for classifying passages with high accuracy depending on whether an answer candidate passage to a question is related to an answer to the question, a computer program used for the answer classifier for training a representation generator for generating a passage representation to be input to the answer classifier, as well as to the representation generator.

Solution to Problem

According to a first aspect, the present invention provides, in natural language processing using a computer, a computer program causing the computer to operate as: a first representation generator, upon receiving a question in natural language and an input forming a pair with the question, outputting a first representation vector representing the input; a second representation generator, upon receiving the question and an answer to the question, outputting a second representation vector representing the answer in a format same as the first representation vector; a discriminator responsive to the first representation vector or the second representation vector at an input for determining whether the input representation vector is the first representation vector or the second representation vector; and a generative adversarial network unit for training the discriminator and the first representation generator by generative adversarial network such that error determination of the first representation vector is maximized and error determination of the second representation is minimized.

Preferably, the first representation generator includes a vector outputting means responsive to receipt of the question and a passage including one or more sentences possibly including an answer to the question, for outputting the first representation vector representing the answer to the question from the passage.

More preferably, the first representation generator includes a vector outputting means responsive to receipt of the question and a passage including one or more sentences selected at random for outputting the first representation vector representing the answer to the question from the passage and the question.

More preferably, the first representation generator includes a vector outputting means responsive to receipt of the question and a random vector consisting of random elements for outputting the first representation vector representing the answer to the question from the random vector and the question.

According to a second aspect, the present invention provides a representation generator trained by any of the above-described computer programs for generating the first representation vector from a passage.

According to a third aspect, the present invention provides an answer classifier, including: the above-described representation generator responsive to receipt of a question and a passage possibly including an answer to the question at an input, for outputting a first representation vector obtained from the passage representing an answer to the question; a passage encoder responsive to receipt of the passage, the first representation vector and the question at an input, for outputting a representation vector encoding the passage, having an attention by the first representation vector and the question added; a question encoder responsive to receipt of the question and the passage, for outputting a representation vector of the question having an attention by the passage added; and a determiner trained beforehand such that upon receiving the first representation vector, the representation vector of the passage and the representation vector of the question, the determiner classifies the passage as a correct answer or an erroneous answer to the question.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 2 shows a question and a positive example of an answer passage to the question.

FIG. 3 shows a question and a positive example of an answer passage to the question.

FIG. 4 shows a question and a negative example of an answer passage to the question.

FIG. 5 shows a question, a positive example of an answer passage to the question, and a core answer prepared based on the positive example.

FIG. 13 shows, in the form of a table, classification accuracy of the answer classifier shown in FIG. 11 using the fake representation generator in accordance with the first embodiment of the present invention, in comparison with the accuracy of conventional answer classifiers.

FIG. 14 is the same table as FIG. 13, indicating that the classification performance of the answer classifier using the fake representation generator in accordance with the first embodiment of the present invention is improved by adopting a core answer representation.

DESCRIPTION OF EMBODIMENTS

Figure 1:
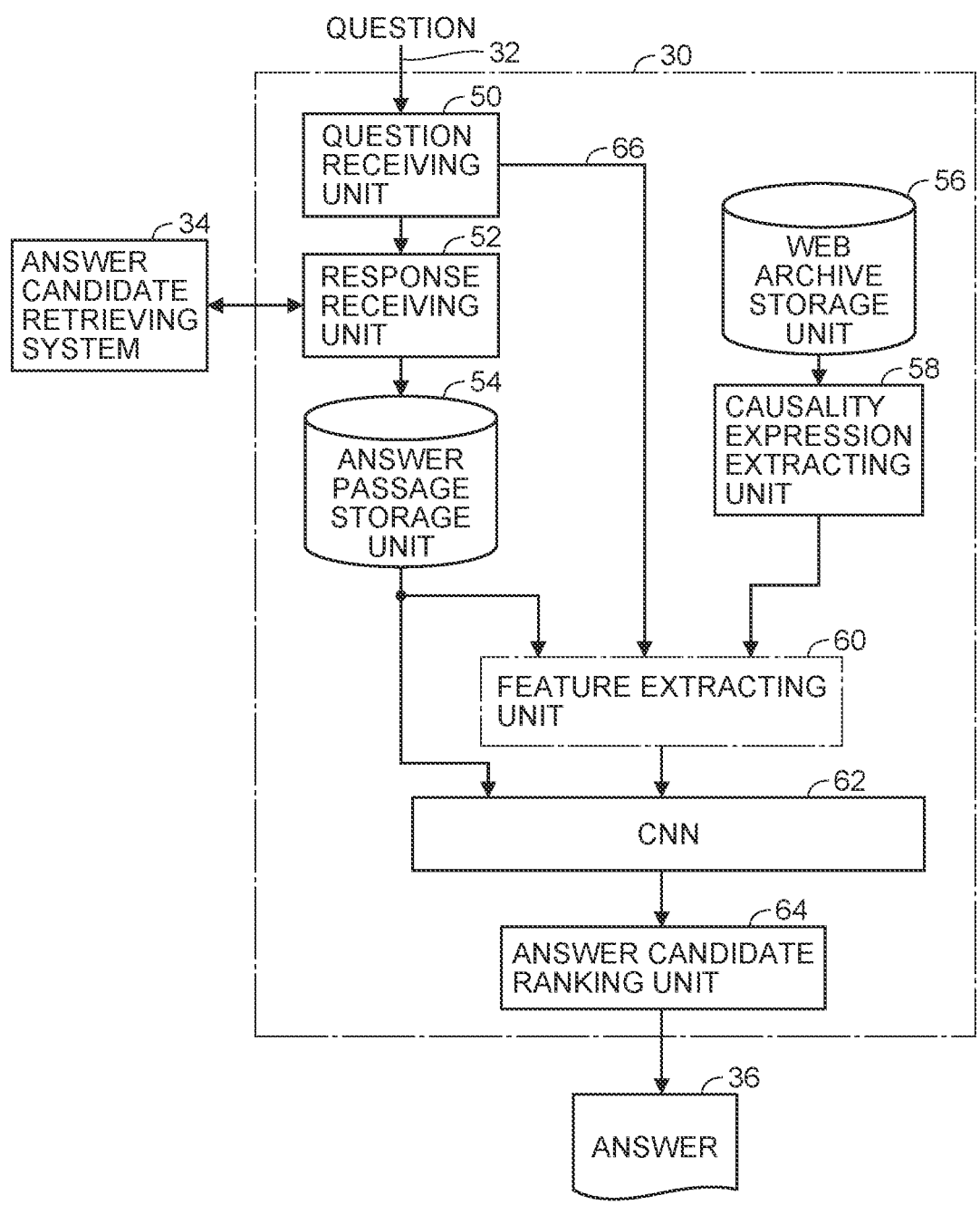
FIG. 1 is a block diagram schematically showing a configuration of a why-type question-answering system disclosed in Patent Literature 1.

In the following description and in the drawings, the same components are denoted by the same reference characters. Therefore, detailed description thereof will not be repeated.

First Embodiment

[Generative Adversarial Network (GAN)]

According to the why-type question-answering system disclosed in Patent Literature 1 above, a group of answer candidate passages to a question is extracted from existing text, and the most appropriate passage as an answer is selected. In contrast, it may be possible to summarize only the "cause sought by the question" from a text fragment related to the answer, within an answer candidate passage. Such a summary will be hereinafter referred to as a "core answer."

Referring to FIG. 5, by way of example, assume that an answer passage 92 is obtained to question 90. An example of a core answer manually prepared based on the answer passage 92 is shown in FIG. 5 as a core answer 110. As can be seen by comparing core answer 110 with answer passage 92, core answer 110 is a right answer to question 90 formed only from the text fragment apt as an answer to question 90, out of passages included in answer passage 92.

For a human being, it is not very difficult to form such a core answer by summarizing passages of a positive example. Forming such a core answer by automatic processing by a computer with high accuracy is extremely difficult.

As a possible technique for forming a core answer from answer passages by an automatic processing on a computer, Generative Adversarial Network (GAN) is known. GAN is often applied for generating an image, allowing generation of a fake image (counterfeit) so elaborate that it is almost indistinguishable from a photo. It might be powerful enough to generate a core answer in natural language processing.

Figure 6:
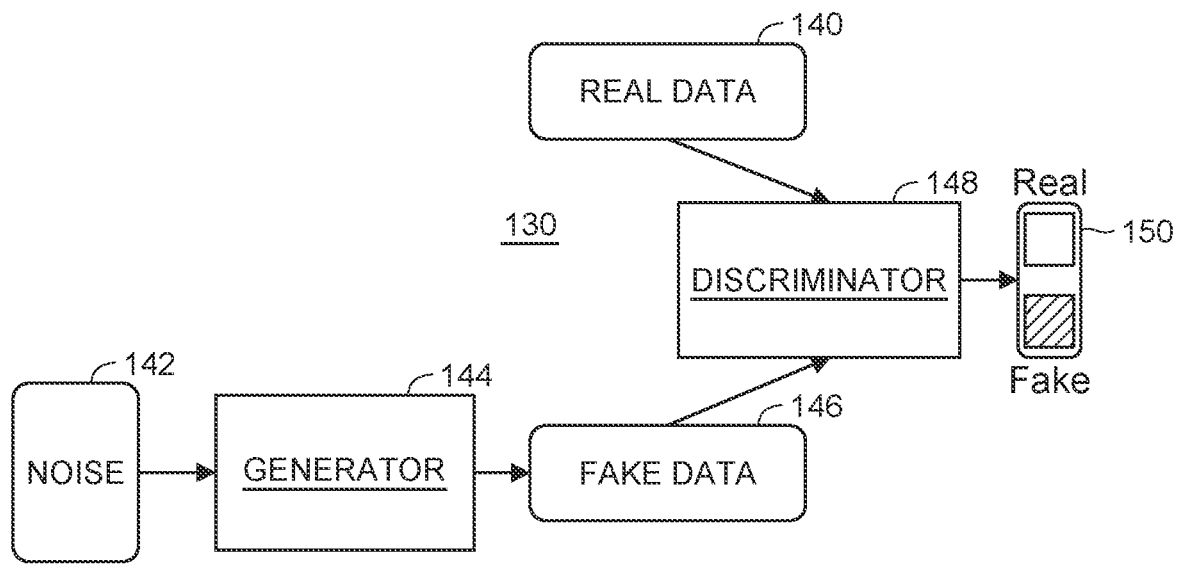
FIG. 6 is a schematic illustration showing a scheme of typical generative adversarial network.

FIG. 6 shows a basic configuration using GAN. Referring to FIG. 6, GAN is for training generator 144. Generator 144 may be one that generates a fake image.

GAN 130 includes: a generator 144 for sampling noise 142 and generating fake data (for example, an image) 146 from the sampled noise; and a discriminator 148 responsive to receipt of real data 140 or fake data 146 at an input, for determining whether it is real or fake, and for outputting the result 150 of discrimination. Discriminator 148 is trained such that it can correctly classify real data 140 and fake data 146 as real and fake, respectively. Generator 144 trains its parameters such that the probability of discriminator 148 erroneously classifying fake data 146 as real becomes the highest. Discriminator 148 and generator 144 are trained alternately and when the determination of discriminator 148 eventually attains 50% or when a prescribed number of repetitions is reached, training ends. When the training ends, generator 144 will be trained so well that it can generate fake data so close to the real data 140 that it is difficult for discriminator 148 to determine whether the data is real or fake.

(Application of GAN to Core Answer Generation)

Figure 7:
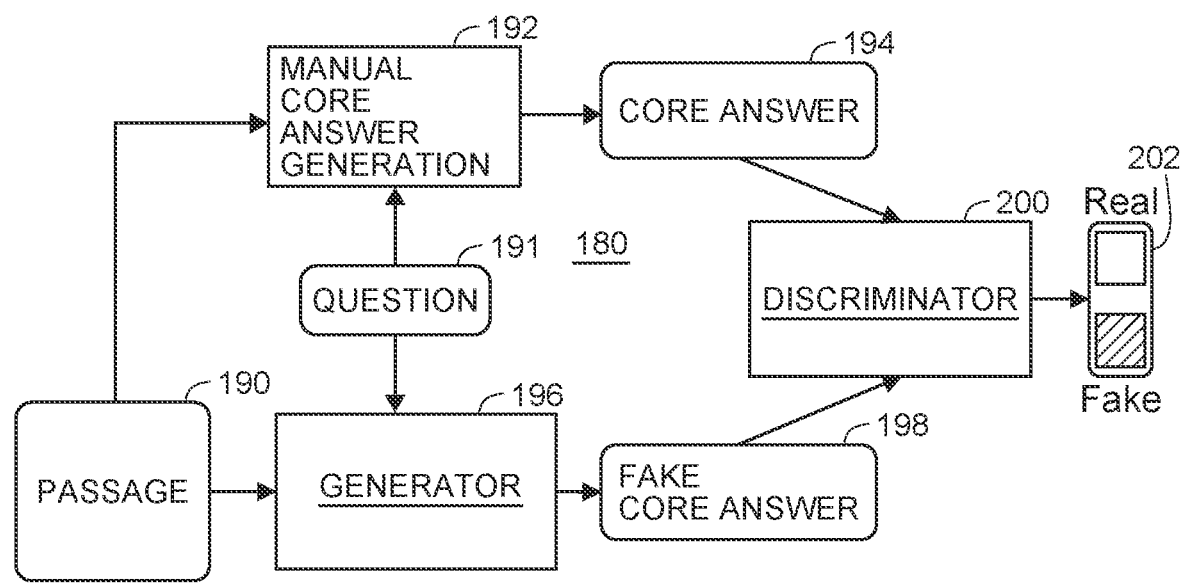
FIG. 7 is a schematic illustration showing a scheme of a virtual system that trains a generator for forming a core answer similar to a core answer manually formed from a passage using generative adversarial network.

Assuming that automatic generation of the core answer mentioned above from a passage by generator 144 is our immediate target, FIG. 7 shows a virtual configuration of GAN that possibly serves as a system to realize this. Referring to FIG. 7, GAN 180 includes: a generator 196 trained to generate a fake core answer 198 from a passage 190 and a question 191; and a discriminator 200 trained to output a discrimination result 202 by correctly classifying a real representation of manually formed core answers 194 as real and a fake core answers 198 formed by generator 196 as fake, by using real representation of core answers 194 formed manually by core answer generation 192 and fake core answers 198 generated by generator 196 based on the passages 190 and questions 191. Generator 196 and discriminator 200 are both neural networks.

GAN 180 trains discriminator 200 such that a core answer 194 is classified as real and fake core answer 198 as fake (that is, to minimize discrimination error). By contrast, generator 196 is trained such that the probability of discriminator 200 determining fake core answer 198 generated by generator 196 from passage 190 to be real (discrimination error probability) becomes the highest. This is based on the game theory, and the probability of the correct discrimination by discriminator 200 eventually attains to 50% as it reaches a Nash equilibrium. By generating a core answer from passage 190 using generator 196 trained in this manner, the core answer may possibly be indistinguishable from manually formed core answer 194.

It is noted, however, that the GAN in accordance with the embodiment described below does not train the generator to generate a fake core answer from passage 190 but trains the generator by generative adversarial network such that some representation (fake representation) of core answer 198 is obtained. As will be described later, by using the generator obtained by such an approach (hereinafter referred to as a "fake representation generator"), whether or not an answer passage provides a correct answer to the question is determined. Surprisingly, the accuracy was clearly higher than the conventional examples.

[Configuration]

Figure 8:
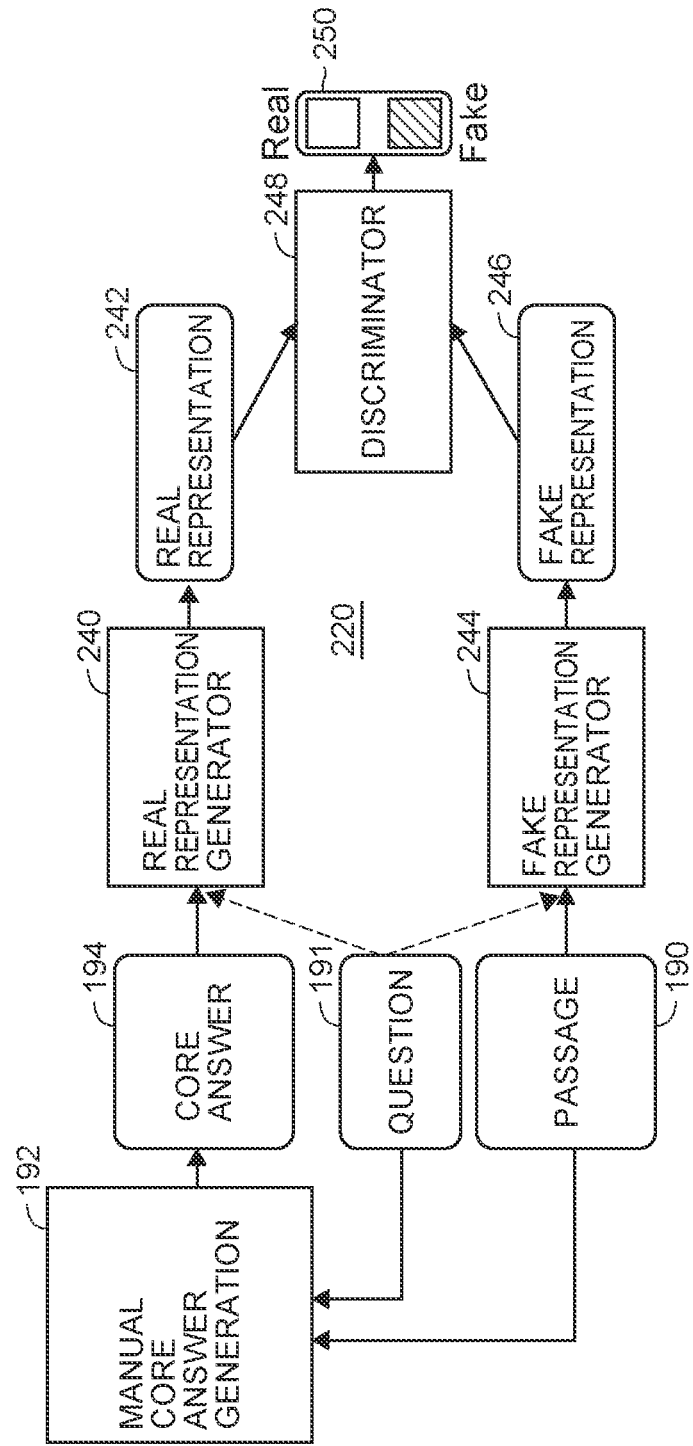
FIG. 8 is a schematic illustration showing a scheme of a system for training a fake representation generator that generates representations similar to the representations obtained from core answers manually formed based on passages, in accordance with a first embodiment of the present invention.

Referring to FIG. 8, a GAN 220 for training a fake representation generator 244 in accordance with the first embodiment is for training fake representation generator 244 by using a large number of triplets each consisting of passage 190, core answer 194 manually formed by core answer generation 192 from passage 190 and question 191 as the source of passage 190. Fake representation generator 244 generates a fake representation 246 from passage 190 and question 191. In the present embodiment, real representation 242 and fake representation 246 are vectors having the same number of elements. Specifically, different from the one shown in FIG. 7, fake representation generator 244 shown in FIG. 8 does not generate the final target object but its vector representation (hereinafter, this is referred to as an "representation vector"). The number of elements of the representation vector is selected in advance to be the maximum number of such vectors obtained from training data.

In addition to fake representation generator 244, GAN 220 further includes: a real representation generator 240 for generating a real representation 242 that is a representation of the same format as fake representation 246, from core answer 194 and question 191; and a discriminator 248 trained to determine real representation 242 to 'real' and fake representation 246 generated by fake representation generator 244 to 'fake', and to output a discrimination result 250 (trained to minimize discrimination error).

Figure 9:
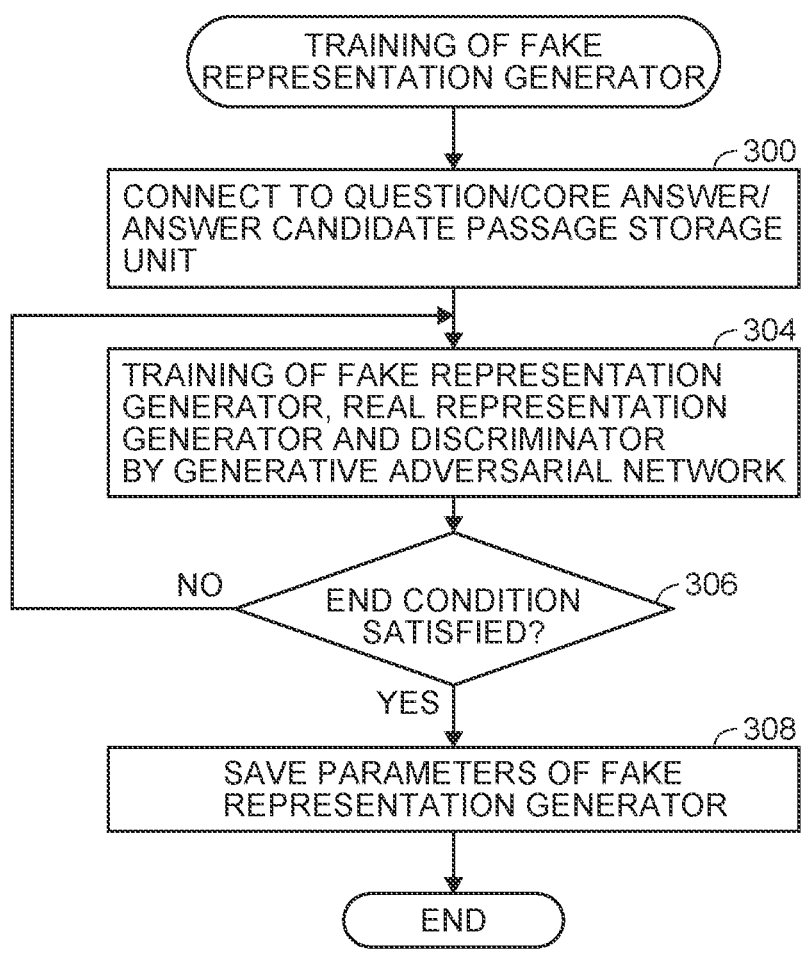
FIG. 9 is a flowchart showing a control structure of a main routine of a program for realizing the generative adversarial network by the system shown in FIG. 8.

As will be described later, training by GAN 220 is realized by computer hardware and computer programs (hereinafter referred to as "programs") executed on the computer hardware. FIG. 9 is a flowchart showing the control structure of the program realizing the training of GAN 220.

Referring to FIG. 9, the program includes: a step 300 of communicably connecting a computer to various storage units for the questions, core answers and answer candidate passages; a step 304 of training fake representation generator 244, real representation generator 240 and discriminator 248 by generative adversarial network between real representation generator 240 and discriminator 248 and fake representation generator 244; a step 306 of determining whether or not an end condition of training is satisfied as a result of step 304, and branching the control flow depending on the result of determination; and a step 308, responsive to the determination at step 306 that the end condition is satisfied, of saving parameters of fake representation generator 244 at that time in a prescribed storage device. If the determination at step 306 is in the negative, the control returns to step 304. Therefore, step 304 is repeated until the end condition is satisfied.

Figure 10:
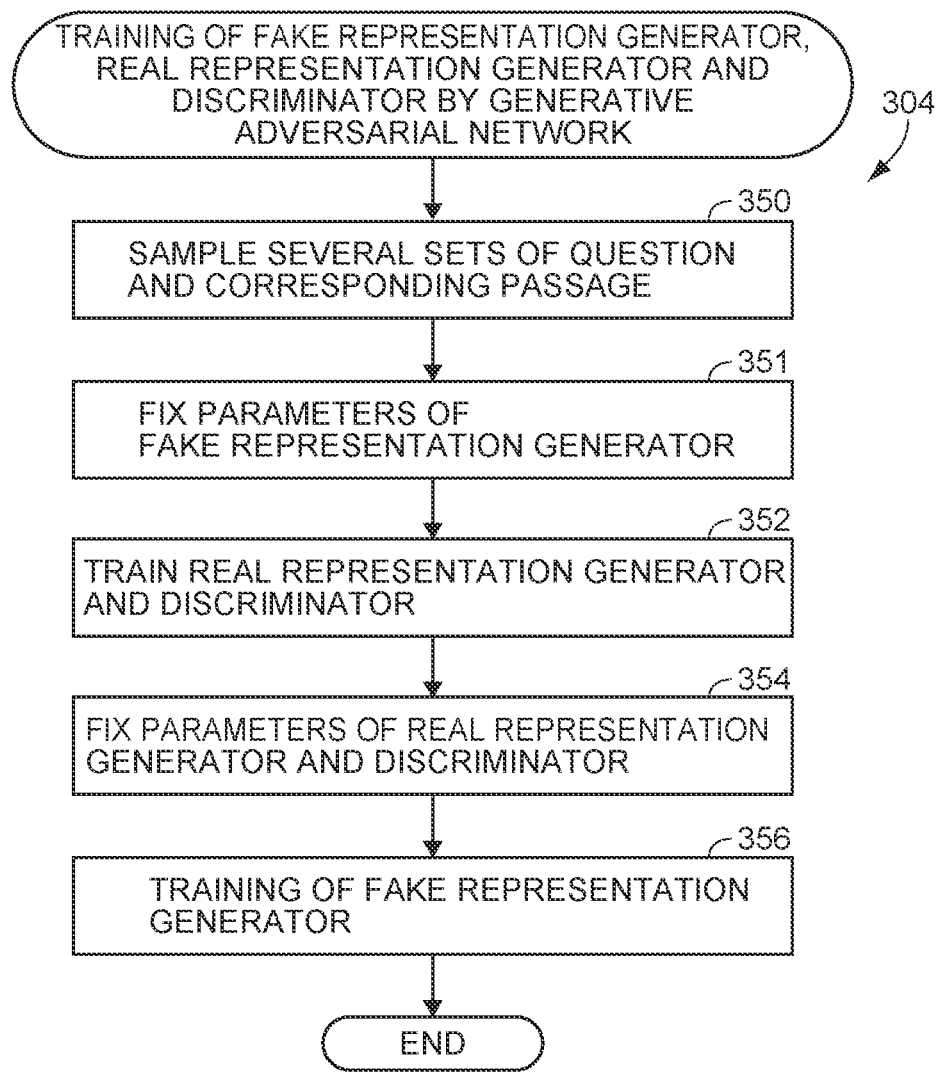
FIG. 10 is a flowchart showing a control structure of a routine for parameter training of the fake representation generator in the program shown in FIG. 9.

Referring to FIG. 10, the program realizing the generative adversarial network at step 304 of FIG. 9 includes: a step 350 of sampling, from training data, a plurality of samples each being a combination of a question and a passage corresponding to the question; a step 351 of fixing parameters of fake representation generator 244; a step 352 of generating real representations 242 by real representation generator 240 by using the core answer and the question of the samples sampled at step 350, and training discriminator 248 such that the probability of discriminator 248 erroneously discriminating these to be fake is minimized; a step 354, following step 352, of fixing parameters of discriminator 248 and real representation generator 240; and a step 356 of generating fake representations 246 by fake representation generator 244 from passage 190 and question 191, and training parameters of fake representation generator 244 such that the probability of discriminator 248 erroneously determining these fake representations 246 to be real representations is maximized.

Figure 11:
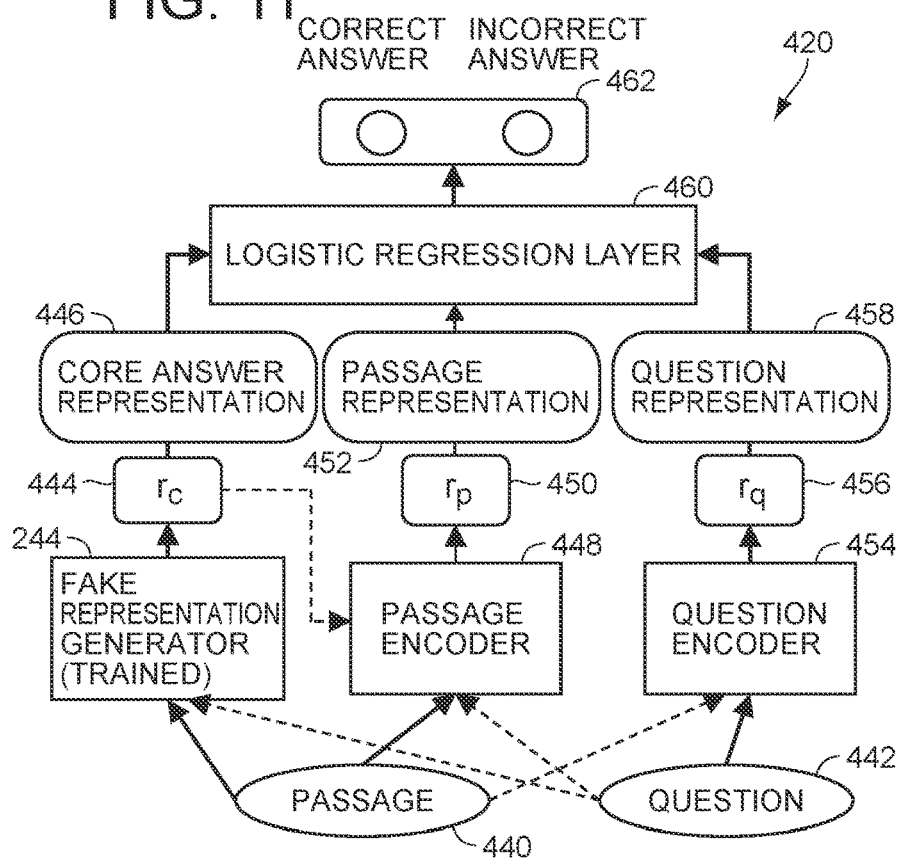
FIG. 11 is a block diagram showing a configuration of an answer classifier determining whether a passage is a correct answer to the question or not, using the fake representation generator trained by the system of which scheme is shown in FIG. 8.

Referring to FIG. 11, the answer identifying classifier 420 for determining whether or not an answer candidate passage 440 provides an apt answer to a question 442 using the fake representation generator 244 trained in the above-described manner includes: the fake representation generator 244 trained in advance by generative adversarial network by the procedures shown in FIGS. 9 and 10; and a passage encoder 448 and a question encoder 454 similarly trained in advance using training data. It is noted, however, that passage encoder 448 and question encoder 454 are trained by common supervised learning rather than the generative adversarial network, using training data for the why-type question-answering system.

Classifier 420 further includes a logistic regression layer 460 receiving, as inputs, a core answer representation 446, a passage representation 452 and a question representation 458, for outputting a classification result 462 indicating whether or not passage 440 is a passage that will give a correct answer to question 442.

Figure 12:
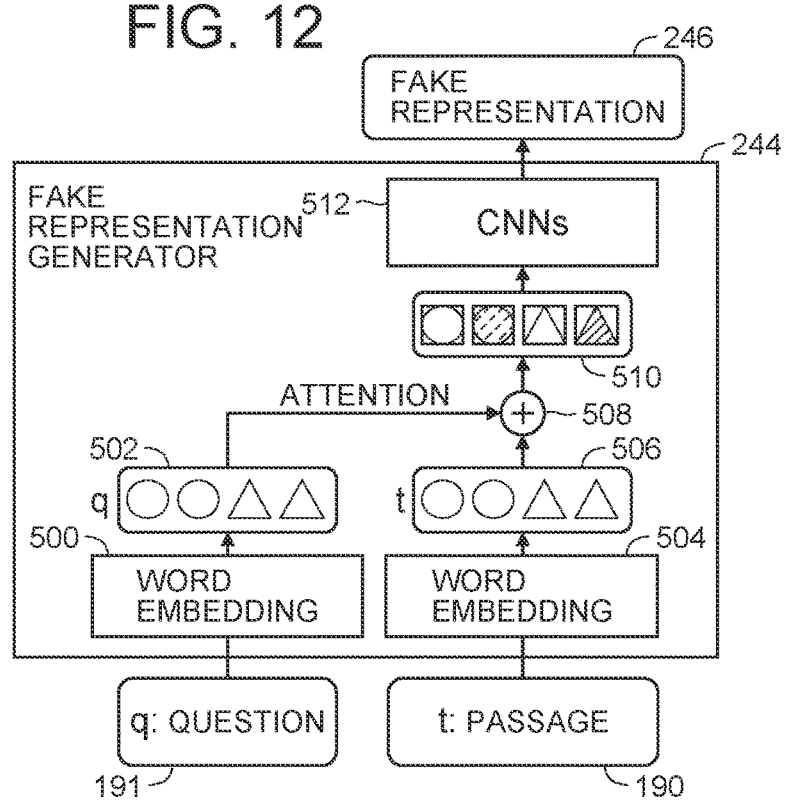
FIG. 12 is a block diagram showing a basic configuration of an encoder for forming the fake representation generator shown in FIG. 8.

Fake representation generator 244 and real representation generator 240 shown in FIG. 8 both have the identical structure called encoder. Referring to FIG. 12, by way of example, fake representation generator 244 includes: a word embedding layer 504 responsive to receipt of a passage 190, for converting each word forming passage 190 to a word embedding vector (hereinafter referred to as a "word vector") and outputting a word vector sequence 506; and a word embedding layer 500 responsive to receipt of question 191, for converting each word forming question 191 to a word vector and outputting a word vector sequence 502.

Fake representation generator 244 further includes: an attention adding unit 508 for adding, to each vector of word vector sequence 506, word vector sequence 502 as an attention and outputting an attention-modified word vector sequence 510; and a CNN 512 having inputs for receiving word vector sequence 510 and pre-trained to output a fake representation 246 (core answer representation vector 444 in FIG. 11) as a representation of passage 190.

Real representation generator 240 shown in FIG. 8 also has the identical structure as fake representation generator 244 including CNN 512. The real representation generator 240 differs from fake representation generator 244 in that the object of encoding is not the passage 190 but the core answer 194. It is noted that the passage encoder 448 and the question encoder 454 shown in FIG. 11 also have the identical structure as the encoder described above.

[Operation]

First, training of fake representation generator 244 shown in FIG. 8 will be described. Fake representation generator 244 is trained by generative adversarial network together with real representation generator 240 and discriminator 248 shown in FIG. 8. Prior to the training, by an existing question-answering system, passages 190 appropriate for various questions 191 are collected and stored associated with respective questions 191 in a storage device. From these passages 190, core answers 194 that are short and apt as answers to questions 191 are generated by manual core answer generation 192, and stored in a storage device.

Referring to FIG. 9, in this training, a computer is connected to the storage unit storing passages 190, questions 191 and core answers 194. Specifically, the computer opens files in the storage device storing the passages 190, questions 191, core answers 194 and others, reads these contents and stores them in a memory. Alternatively, passages 190, questions 191 and core answers 194 are read from database that stores these, and stored in a memory (step 300).

Thereafter, fake representation generator 244 and real representation generator 240, and discriminator 248 are trained against each other by generative adversarial network (step 304).

Referring to FIG. 10, in the training using generative adversarial network, a plurality of sets each containing a question 191 and a passage to the question is sampled from training data (step 350). Thereafter, parameters of fake representation generator are fixed (step 351). Using the sampled question 191 and a core answer 194 to the question 191, real representation generator 240 generates a real representation 242 and applies it to discriminator 248. Discriminator 248 determines whether or not this real representation 242 is real. Using the results of determination on the sampled training data as a whole, parameters of discriminator 248 and real representation generator 240 are trained while the parameters of fake representation generator 244 are fixed so as that erroneous determination becomes zero.

Then, parameters of discriminator 248 and real representation generator 240 are fixed (step 354). While the parameters of discriminator 248 are kept fixed, fake representation generator 244 is trained using question 191 and passage 190 corresponding thereto (step 356). Specifically, fake representation generator 244 generates a fake representation 246. Discriminator 248 determines whether the fake representation 246 is a real representation or not. The determination is done on a plurality of questions 191, and parameters of fake representation generator 244 are adjusted such that erroneous determination by discriminator 248 is maximized, that is, the probability of discriminator 248 determining the fake representation 246 to be a real representation becomes larger, while parameters of discriminator 248 and real representation generator 240 are kept fixed.

By repeating such a process, the real representations by real representation generator 240 and discriminator 248 and the fake representations by fake representation generator 244 reach a Nash equilibrium within game theory, and the result of determination by discriminator 248 attains to the state where correct determination and error determination are 50% and 50%, respectively. Referring to FIG. 9, at step 306, whether or not the determination accuracy of discriminator 248 has reached a Nash equilibrium or a prescribed state near a Nash equilibrium is determined. If the result of determination is in the negative, the control returns to step 304 and training by generative adversarial network of fake representation generator 244 continues. If the result of determination at step 306 is in the positive, parameters of fake representation generator 244 are stored in a storage device at step 308 and the process ends.

Referring to FIG. 11, fake representation generator 244 of classifier 420 is trained by the generative adversarial network as described above. Therefore, a core answer representation generated by fake representation generator 244 is now difficult for discriminator 248 shown in FIG. 8 to determine whether it is a real representation or a fake representation.

Likewise, passage encoder 448 and question encoder 454 have such a configuration as shown in FIG. 12 as does fake representation generator 244. It is noted, however, that different from fake representation generator 244, passage encoder 448 and question encoder 454 are not pre-trained by generative adversarial network.

Referring to FIG. 11, training data consisting of combinations of a question and a passage including a correct answer to the question, and combinations of a question and a passage not including a correct answer to the question, are prepared as question 442 and passage 440. On each combination, a label is added indicating that it is a correct answer or an erroneous answer, depending on whether the passage includes a correct answer or not.

In classifier 420, passage 440 and question 442 are applied to fake representation generator 244. Fake representation generator 244 outputs a core answer representation vector 444, which is the passage 440 having an attention of question 442 added. Core answer representation vector 444 is applied to a logistic regression layer 460 as a core answer representation 446.

Passage 440, core answer representation vector 444 obtained for the passage 440 by fake representation generator 244 and question 442 are applied to passage encoder 448. Passage encoder 448 adds attentions of question 442 and core answer representation vector 444 to passage 440 and outputs a passage representation vector 450. Passage representation vector 450 is applied to logistic regression layer 460 as a passage representation 452.

On the other hand, to question encoder 454, question 442 and passage 440 are applied. Question encoder 454 adds attention of passage 440 to question 442 and outputs a question representation vector 456. Question representation vector 456 is applied to logistic regression layer 460 as a question representation 458.

Logistic regression layer 460 receives at its inputs the core answer representation 446, passage representation 452 and question representation 458, and using the parameters of logistic regression layer and Softmax function, outputs a classification result 462 consisting of a probability that passage 440 includes a correct answer to question 442.

In classifier 420, parameters as a whole except for fake representation generator 244 are adjusted such that error becomes smaller in accordance with back propagation based on the error between the classification result 462 obtained in this manner and the label of passage 440 prepared beforehand. By performing such a process using the whole training data, training of classifier 420 is completed.

During the testing operation of classifier 420 on passage 440, respective units of classifier 420 operate in the same manner as at the time of training. In the testing operation, however, whether the passage 440 includes a correct answer to question 442 or not is determined in accordance with the classification result 462 eventually obtained from classifier 420.

[Results of Experiments]

Experiments (answer identifying experiments) were conducted using the classifier 420 described above to test whether a passage applied to a question in Japanese is a correct answer or not. The question is a why-type question. As the training data for generative adversarial network, only the training data set was picked-up and used from answer summary data set (Reference A2) of DIRECT (Reference A1). The training data set included 15,130 triplets (question, passage, core answer).

As data for identifying an answer, 10,401 pairs of question/passage automatically formed from the 15,130 triplets of training data for the generative adversarial network were added to the DIRECT data set mentioned above. The added data will be referred to as "AddTr." The additional data is used in order to compare performance with other methods such as Baseline method described below, when training is done with the same amount of training data as GAN in accordance with the embodiment above.

FIG. 13 shows the results. In FIG. 13, the result 550 on the first row denoted by "OH17" represents the result obtained by the system described in Reference A3 as listed below. In FIG. 13, "P@1" represents precision of the top-ranked answer. "MAP" stands for mean average precision.

Referring to result 552 on the second and third rows of FIG. 13, "BASE" shows a result when an answer was specified without using the core answer representation. "+AddTr" denotes a result of answer identification when AddTr described above was used as additional training data.

Referring to result 554 including the fourth, fifth and sixth rows of FIG. 13, "+CAns" denotes a result when a core answer representation was generated from the core answer automatically generated in accordance with the method described in Reference A2 above. "+CEnc" denotes a result obtained using an output of a passage encoder in accordance with the method of Reference A2 in place of the output of fake representation generator 244 (see FIG. 11). "+Enc" trains fake representation generator 244 not by generative adversarial network but simultaneously with the training of answer identifying classifier, and utilizes its representation. Here, fake representation generator 244 is not pre-trained.

In result 556 including the seventh, eighth and ninth rows of FIG. 13, "BERT" uses BERT model described in Reference A4 as listed below, rather than CNN, for question and passage analysis. Here, as in the case of BASE, the representation of core answer is not used. "+AddTr" denotes the result when AddTr was used as additional training data, as in the case of BASE. "+AGR" denotes the result when fake representation generator 244 (FIG. 11) of the above-described embodiment was added to BERT and core representation was used.

The result 558 in the last raw denotes the result of the above-described embodiment.

Referring to FIG. 14, results 600 including results 552 and 554 represent accuracy of answer identification by the methods both based on Baseline. The accuracy of result 558 of the embodiment above was higher than both of these. From the comparison between results 602 and 604, it can be seen that, when the core answer representation of the embodiment above was used, performance of answer identification improved.

Figures 15, 16:
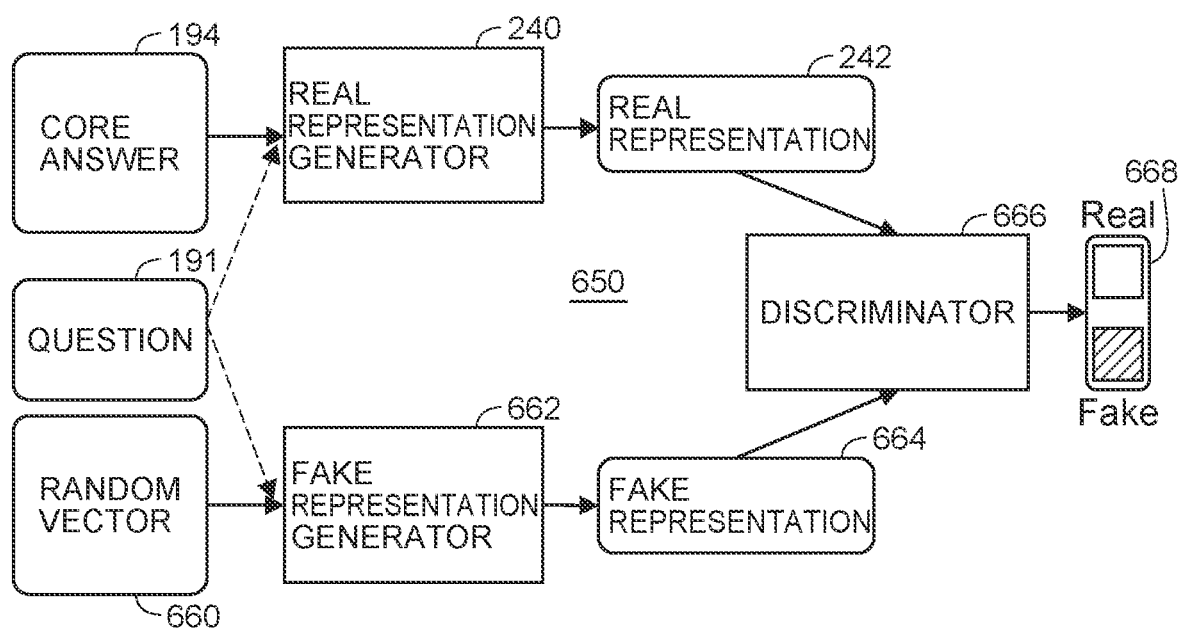
FIG. 15 is the same table as FIG. 13, indicating that improvement in classification performance of the answer classifier using the fake representation generator based on the core answer representation used in the first embodiment of the present invention is larger than those using other core answer representations.
FIG. 16 is a schematic illustration showing a scheme of a system for training a fake representation generator in accordance with a second embodiment of the present invention.

Referring to FIG. 15, from the comparison between results 554 and 558, it can be seen that the core answer representation of the embodiment above significantly contributes to the improvement of performance, as compared with the methods using CAns, CEnc or Enc as core answer representations.

Second Embodiment

[Configuration]

In the first embodiment above, real representation 242 and fake representation 246 are both obtained from passage 190 as shown in FIG. 8. Referring to FIG. 16, a GAN 650 in accordance with the second embodiment includes: real representation generator 240 same as the one shown in FIG. 8; a fake representation generator 662 configured to receive question 191 and a random vector 660 consisting of elements selected at random at inputs, and to output a fake representation 664 through the same process as fake representation generator 244 shown in FIG. 8; and a discriminator 666 responsive to real representation 242 or fake representation 664 at inputs, being trained to discriminate the input to be a real representation or fake representation and to output a discrimination result 668. The number of elements of the random vector is determined beforehand in accordance with the size of the largest passage.

Training of GAN 650 is the same as that of GAN 220 in accordance with the first embodiment, except that random vector 660 is used in place of passage 190 of FIG. 8.

Fake representation generator 662 and discriminator 666 have the identical structure as fake representation generator 244 and discriminator 248 shown in FIG. 8, respectively. These are trained, however, using data (random vector 660) different from passages 190 shown in FIG. 8 as the training data and, therefore, their parameters become different from those shown in FIG. 8 and, hence, they behave differently.

[Operation]

Operations of GAN 650 during training and answer identification are the same as those of GAN 220 in accordance with the first embodiment. The only difference from the first embodiment is that not a passage but random vector 660 is given to fake representation generator 662 during training and answer identification.

By GAN 650 in accordance with the second embodiment, effects clearly better than the conventional examples were attained, though not as high as those of the first embodiment. These effects will be described later, together with the effects of the third embodiment.

Third Embodiment

[Configuration]

Figures 17, 18:
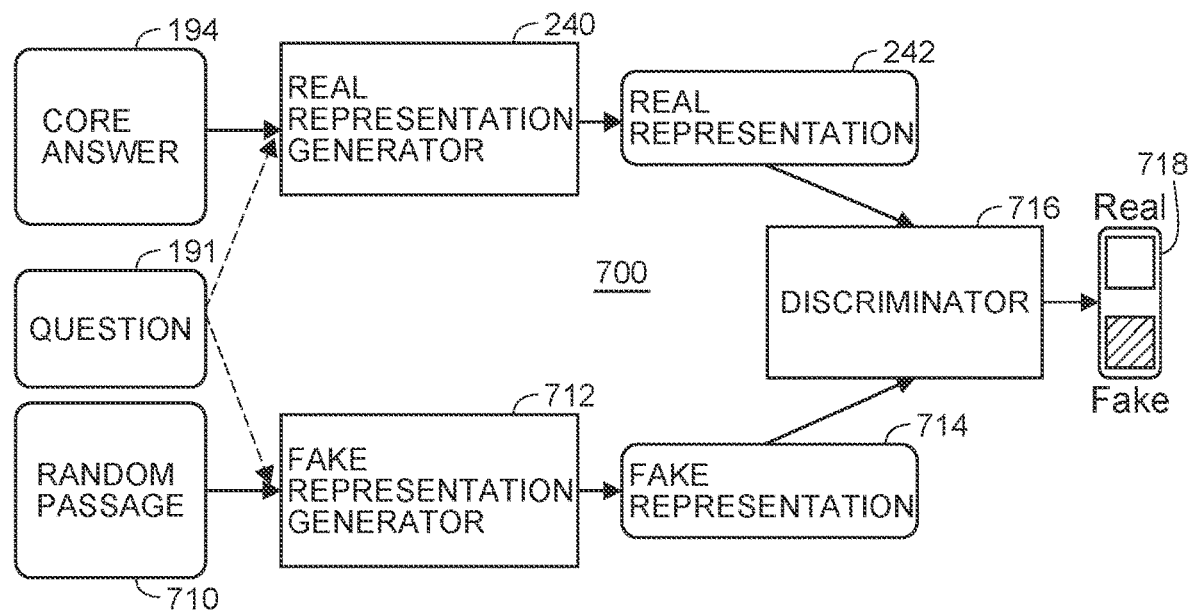
FIG. 17 is a schematic illustration showing a scheme of a system for training a fake representation generator in accordance with a third embodiment of the present invention.
FIG. 18 shows, in the form of a table, accuracy of answer classifiers adopting the fake representation generators of the first, second and third embodiments of the present invention, in comparison with base values.

FIG. 17 shows a configuration of a GAN 700 in accordance with a third embodiment. Referring to FIG. 17, GAN 700 includes: a real representation generator 240 responsive to receipt of core answer 194 for outputting real representation 242; a fake representation generator 712 having the identical structure as that of fake representation generator 244 shown in FIG. 8, responsive to receipt of a random passage 710 selected at random from passages collected as possibly containing answers and question 191 at its inputs, for outputting a fake representation 714 of random passage 710; and a discriminator 716 responsive to receipt of real representation 242 or fake representation 714 at its input, being pretrained to discriminate real representation 242 and fake representation 714, for outputting a discrimination result 718. Question 191 is not related to random passage 710.

Training of GAN 700 is done in the same way as that of GAN 220 of the first embodiment except that random passage 710 is used in place of passage 190 of FIG. 8.

[Operation]

GAN 700 operates in the same way as that of GAN 220 in accordance with the first embodiment during training and answer identification. The only difference from the first embodiment is that not a passage but random passage 710 is given to fake representation generator 712 during training and answer identification.

By GAN 700 in accordance with the third embodiment also, effects clearly better than the conventional examples were attained, though not as high as those of the first embodiment.

[Results of Experiments Related to the Second and Third Embodiments]

FIG. 18 shows, in the form of a table, results of experiments related to the second and third embodiments. Referring to FIG. 18, "BASE" is the same as "BASE" on the second row of FIG. 15. "Proposed (RV)" shows results related to the second embodiment. "RV" stands for "Random Vector." "Proposed (RP)" represents results related to the third embodiment. "RP" stands for "Random Passage." "Proposed" represents results by the first embodiment, same as the result 558 on the last row of FIG. 15.

Comparing FIG. 18 with FIG. 15, it can be seen that Proposed (RV) and Proposed (RP) both attained clearly higher accuracy than BASE shown in FIG. 18, though not as high as the first embodiment, and that both attained comparative or higher results than any other methods shown in FIG. 15.

Fourth Embodiment

[Configuration]

Figure 19:
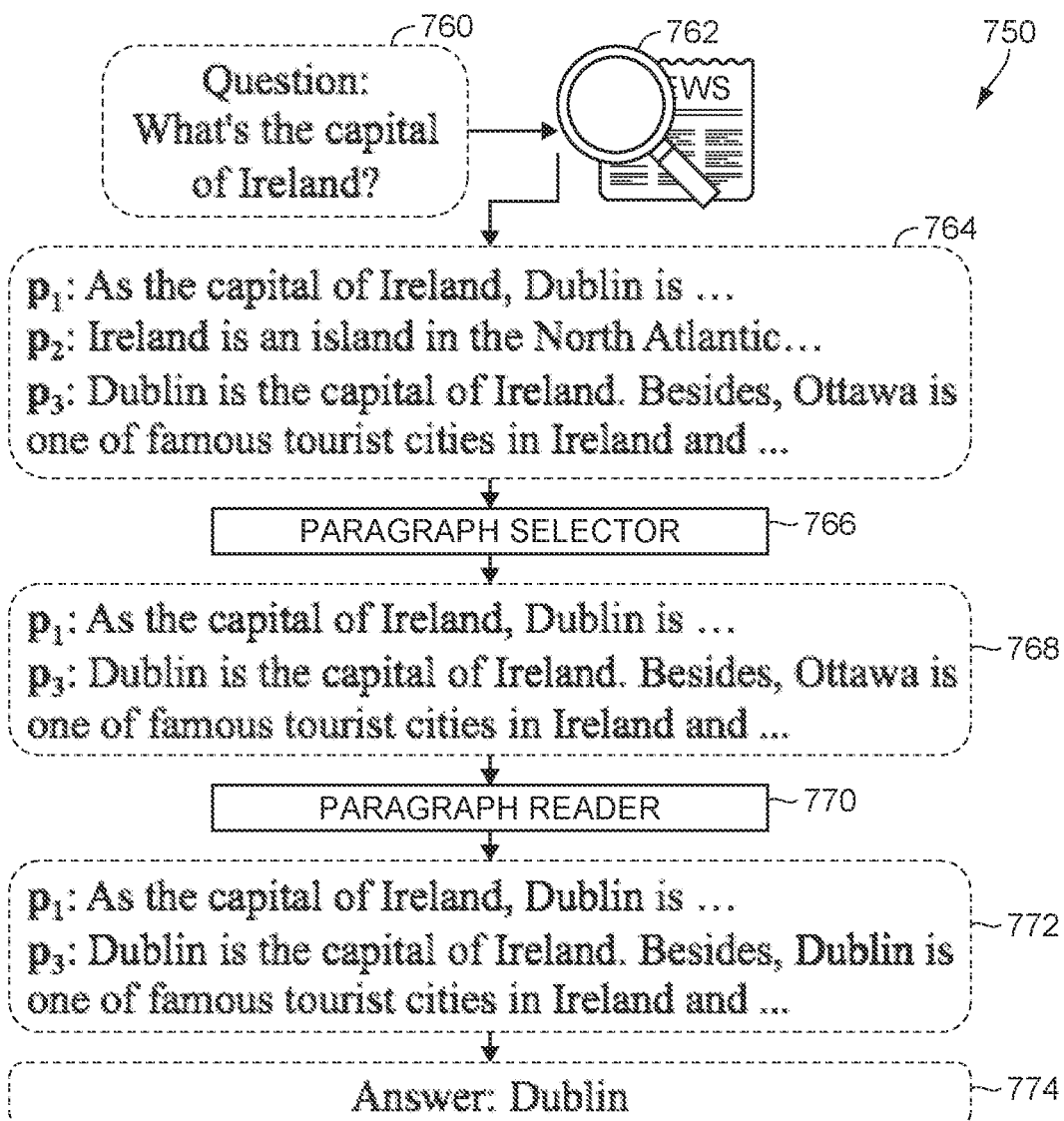
FIG. 19 is a schematic illustration showing a process of a conventional Open QA system.

A question-answering system for English has a task called Distantly supervised open-domain QA (DS-QA), which is described in Reference A5 below. Referring to FIG. 19, the task 750 is to receive a question 760, to search for a plurality of passages 764 and to extract an answer 774 from the passages 764. Main question type is what-type. Therefore, an answer often consists of a word or a nominal phrase, and tends to be shorter than an answer to a why-type question. More specifically, this task 750 involves a paragraph selector 766 selecting a set 768 of paragraphs having high probability of containing an answer from the passages, and a paragraph reader 770 calculating a set 772 of answer candidates formed of word sequences having the highest probability to be an answer to question 760, when the set 768 of paragraphs selected by paragraph selector 766 and question 760 are applied. From the set 772 of answer candidates, an answer 774 is extracted.

Figure 20:
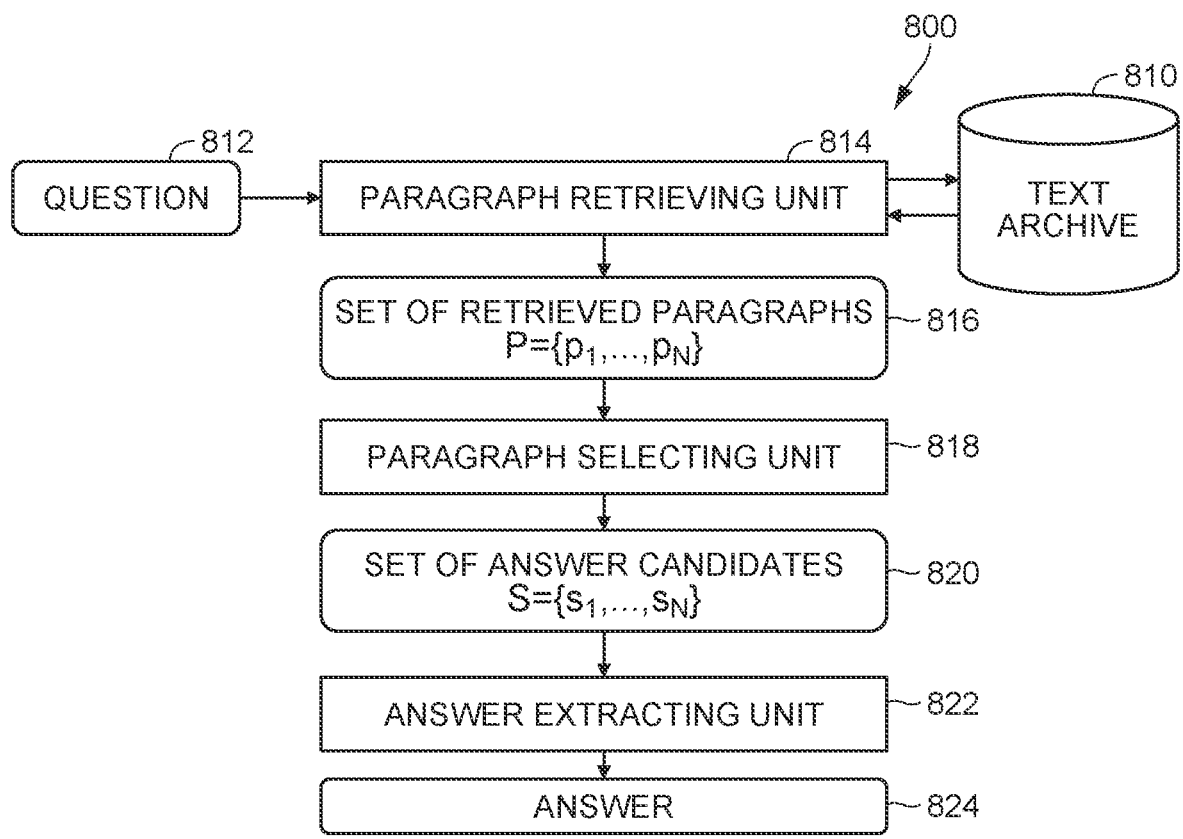
FIG. 20 is a block diagram showing a configuration of the Open QA system shown in FIG. 19.

Referring to FIG. 20, an exemplary question-answering system 800 executing the task 750 described in Reference A5 includes a text archive 810; and a paragraph retrieving unit 814 responsive to a question 812 for searching for and retrieving a set 816 of paragraphs including answer candidates from text archive 810. The set 816 of paragraphs is defined by P={$p_1, \ldots, p_N$}, where $p_1, \ldots, p_N$ each represents a paragraph (N=positive integer). Question-answering system 800 further includes a paragraph selecting unit 818 selecting, from each of the paragraphs $p_1, \ldots p_N$ included in the set 816 of paragraphs, a text fragment (answer candidate) having high possibility of being a correct answer and generating a set 820 of answer candidates. When we represent the set 820 of answer candidates by S, S={$s_1, \ldots, s_N$}, where $s_1, \ldots, s_N$ are answer candidates selected from paragraphs $p_1, \ldots, p_N$, respectively.

Question-answering system 800 further includes an answer extracting unit 822 configured to extract, from the set 820 of answer candidates, an answer candidate having the highest probability of being a correct answer to question 812, and to output it as an answer 824.

Figure 21:
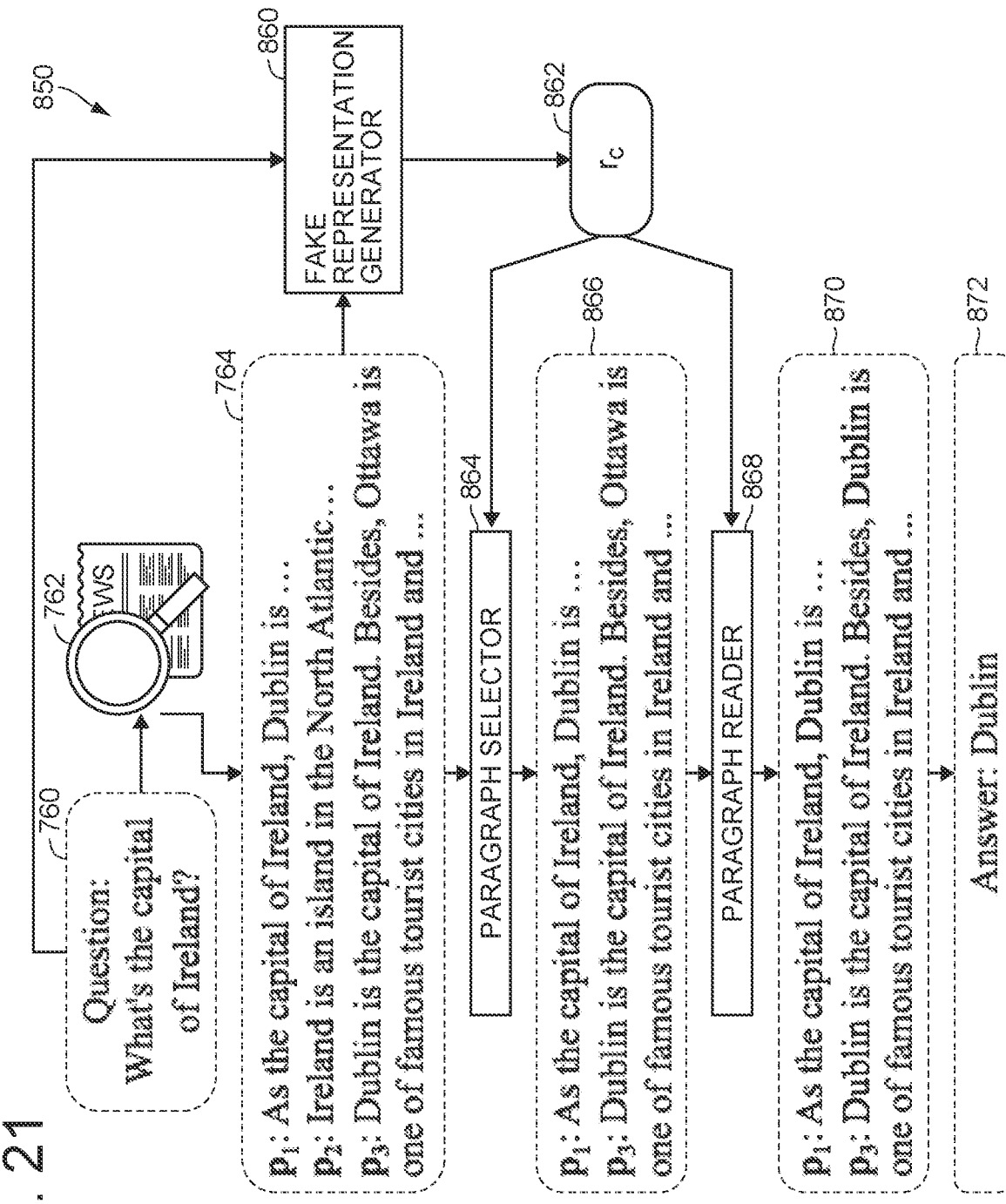
FIG. 21 is a schematic illustration showing a process by the Open QA system adopting the fake representation generator in accordance with an embodiment of the present invention.

In order to study generalization performance of the fake representation generator in accordance with the embodiments above as regards whether it is effective not only for why-type questions but also for what-type questions, the fake representation generator is applied to the DS-QA task in the fourth embodiment. FIG. 21 is an illustration showing the concept.

Referring to FIG. 21, a task 850 for performing the same process as the above-described task 750 using the fake representation generator includes a fake representation generator 860 in accordance with any of the embodiments above, responsive to receipt of a question 760, configured to retrieve 762 for passages 764 and to generate a fake representation 862 from passages 764.

The task 850 involves, in place of paragraph selector 766 and paragraph reader 770 of task 750 shown in FIG. 19, a paragraph selector 864 and a paragraph reader 868 realizing the same functions as those of paragraph selector 766 and paragraph reader 770, respectively, using a fake representation 862. Here, it is assumed that paragraphs selected by paragraph selector 864 form a set 866 of paragraphs and that answer candidates selected by paragraph reader 868 form a set 870 of answer candidates. As in FIG. 19, an answer 872 is extracted from answer candidates 870.

Figure 22:
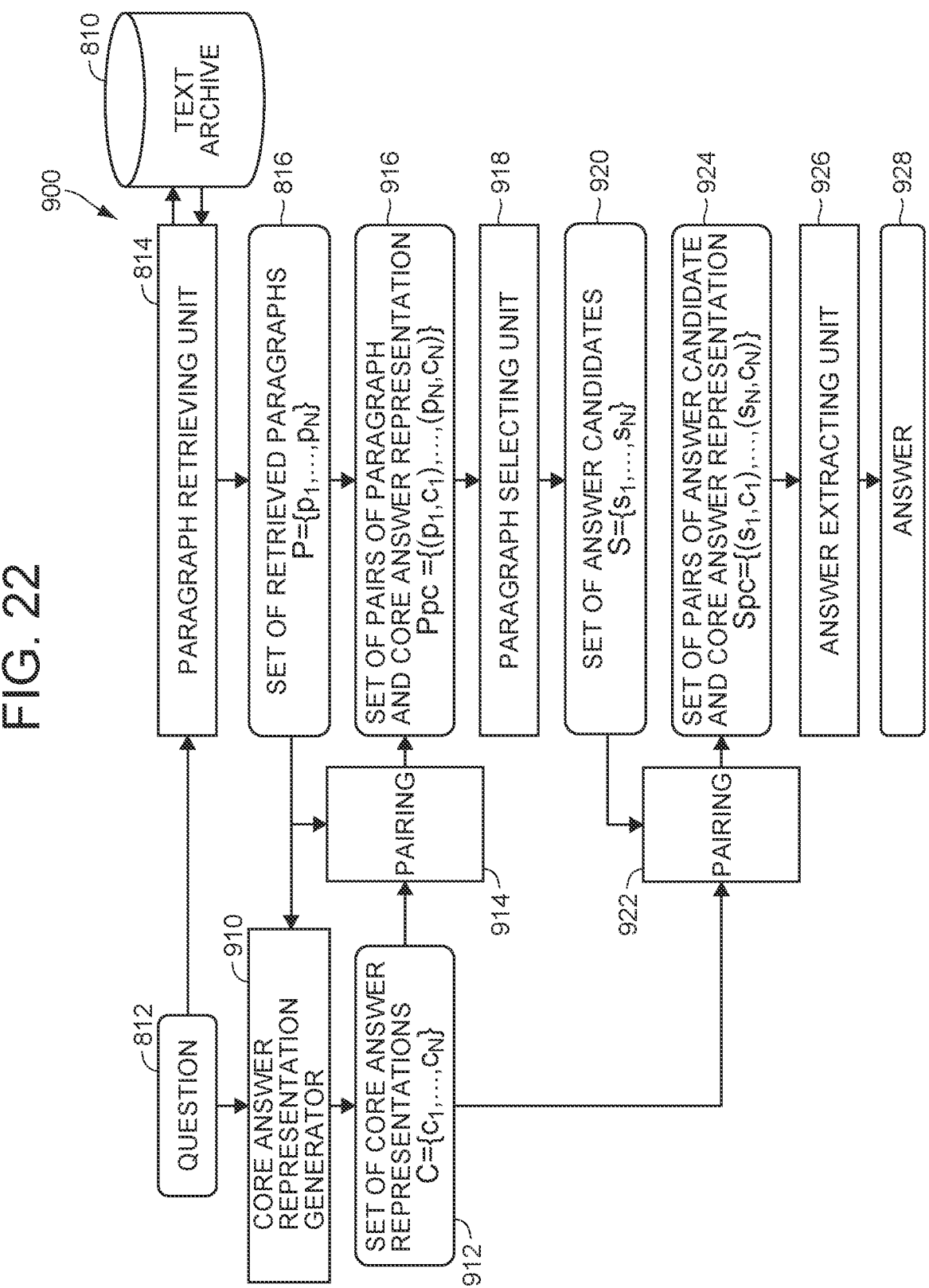
FIG. 22 is a block diagram showing a configuration of the Open QA system adopting the fake representation generator in accordance with an embodiment of the present invention.

FIG. 22 schematically shows a configuration of question-answering system 900 in accordance with the present embodiment that performs task 850. Referring to FIG. 22, question-answering system 900 includes: a text archive 810; and a paragraph retrieving unit 814 receiving a question 812 and searching and taking out a set 816 of paragraphs including answer candidates from text archive 810. The set 816 of paragraphs is represented as P={$p_1, \ldots, p_N$}, where $p_1, \ldots, p_N$ each represents a paragraph (N=positive integer).

Question-answering system 900 further includes a core answer representation generator 910 configured to receive each of the paragraphs included in the set 816 of paragraphs and question 812 at its inputs, and to generate a set 912 of core answer representations. These core answer representations are obtained one for each of the paragraphs $p_1, \ldots, p_N$. These core answer representations will be represented as $c_1, \ldots c_N$. Specifically, the set 912 of core answer representations is given as C={$c_1, \ldots c_N$}. As core answer representation generator 910, any one that is trained in accordance with the embodiments above or similar methods may be used.

Question-answering system 900 further includes a pairing unit 914 for pairing each of the paragraphs $p_1, \ldots, p_N$ in the set 816 of paragraphs with the core answer representations $c_1, \ldots, c_N$ obtained from these paragraphs (combining one paragraph with one core answer representation obtained therefrom) and thereby forming a set 916 of paragraph-core answer representation pairs. The set 916 of paragraph-core answer representation pairs can be given as Ppc={($p_1, c_1$), $\ldots$, ($p_N, c_N$)}.

Question-answering system 900 further includes a paragraph selecting unit 918 selecting, for each paragraph of the set 916 of paragraph-core answer representation pairs, that text fragment in the paragraph which has the highest probability of being an answer to question 812 as an answer candidate, and thereby generating a set 920 of answer candidates of respective paragraphs. Again, when we represent the set 920 of answer candidates of respective paragraphs as S, S={$s_1, \ldots, s_N$}.

Question-answering system 900 further includes a pairing unit 922 pairing each element $s_1, \ldots, s_N$ of the set 920 of answer candidates of respective paragraphs and core answer representation $c_1, \ldots, c_N$ corresponding to respective elements $s_1, \ldots, s_N$ of the set 912 of core answer representations, and thereby generating a set 924 of answer candidate-core answer representation pairs of respective paragraphs. The set 924 of answer candidate-core answer representation pairs of respective paragraphs is given as Spc={$(s_1, c_1), \ldots, (s_N, c_N)$}.

Question-answering system 900 further includes an answer extracting unit 926 configured to select, from the set 924 of answer candidate-core answer representation pairs, a pair including the answer candidate having the highest probability of being an answer to question 812, and to output the answer candidate included in the pair as an answer 928 to question 812.

In the present embodiment, as described above, any core answer representation generator may be used as core answer representation generator 910 provided that it is trained by the method in accordance with the first to third embodiments. Further, as paragraph retrieving unit 814, one that uses a clue word in text may be used, in the similar manner as the conventional paragraph retrieval. Paragraph selecting unit 918 and answer extracting unit 926 may be realized by statistical models pretrained through machine learning to calculate the score of each candidate.

Paragraph selecting unit 918 is trained using training data which includes a question/paragraph/core-answer-representation triplet consisting of a question, a paragraph and a core answer representation generated from the question as an input, and teacher data including a label indicating whether or not the paragraph includes an answer to the question.

Likewise, answer extracting unit 926 is trained using training data which includes a question/answer-candidate/core-answer-representation triplet consisting of a question, an answer candidate, and a core answer representation generated from the question and its answer candidate as an input, and teacher data including a label indicating whether the answer candidate is a correct answer to the question.

In the question-answering system disclosed in Reference A5, the probability that the answer candidate is a correct answer is eventually calculated in accordance with the following equation. When an answer A to a question q is to be found from a given set P={$p_i$} of paragraphs, the paragraph selecting unit 818 and answer extracting unit 822 of FIG. 20 calculate conditioned probability Pr ($p_i$|q, P) and conditioned probability Pr (A|q, $p_i$), respectively. The final output Pr (A|q, P) is calculated by combining these probabilities.

In the present embodiment, the core answer representation $c_i$ generated from paragraph $p_i$ is combined with the above-described framework, in accordance with the equation below.

$$Pr(a \mid q, P, C) = \sum_i Pr(a \mid q, p_i, c_i) Pr(p_i \mid q, P, c_i)$$ [Equation 1]

According to Reference A5, paragraph selecting unit 818 and answer extracting unit 822 use Bidirectional Stacked RNN in encoding paragraphs. As an input, a word vector sequence $p_i$ of the paragraph is used. In this regard, according to the present embodiment, a core answer representation $c_i$ is further used to calculate a word vector $\bar{p}_i$ weighted with attention is from the paragraph. For the word vector $p_i^j$ of the j-th word in paragraph $p_i$, an attention-modified word vector $\bar{p}_i^j$ was calculated by using the attention weighting described in Reference A6 and bi-linear function described in Reference A7. This calculation is represented by the following equation, assuming matrix M∈$R^{d \times d}$, and d=300.

$$\bar{p}_i^j = \text{softmax}_j(p_i^\perp M c_i) p_i^j$$ [Equation 2]

Here, each element of matrix M will be the object of learning. The "Softmax$_j$" represents a j-th element of vector x after Softmax function is applied. The word vectors $p_i^j$ and $\bar{p}_i^j$ were concatenated and used as input to bidirectional multi-layer RNN as j-th word vector of paragraph $p_i$.

[Operation]

Question-answering system 900 operates as follows. Question-answering system operates roughly in two phases: a training phase and a test phase. Text archive 810 has a large amount of text collected beforehand.

In the training phase, core answer representation generator 910, paragraph selecting unit 918 and answer extracting unit 926 are trained using training data respectively prepared in advance. To train core answer representation generator 910, generative adversarial network described above is used.

In the test phase, upon receipt of a question 812, paragraph retrieving unit 814 extracts paragraphs that possibly include an answer to question 812 using a clue word and the like from text archive 810, and generates a set 816 of paragraphs. In parallel, core answer representation generator 910 combines each of the paragraphs in set 816 of paragraphs with question 812 and thereby generates a set 912 of core answer representations. Pairing unit 914 pairs a paragraph and its core answer representation, and thereby generates a set 916 of paragraph-core answer representation pairs.

Paragraph selecting unit 918 selects paragraphs (answer candidates) having high probability of including an answer to question 812 from the set 916 of paragraph-core answer representation pairs and generates a set 920 of answer candidates. Pairing unit 922 pairs each answer candidate in the set 920 of answer candidates and the core answer representation corresponding to the answer candidate, and thereby generates a set 924 of answer candidate-core answer representation pairs.

Answer extracting unit 926 extracts an answer candidate having the highest probability of being an answer to question 812 from answer candidates in the set 924 of answer candidate-core answer representation pairs, and outputs it as an answer 928.

Effects

In order to evaluate the performance of question-answering system in accordance with the above-described embodiment, the method was compared with four other methods. Table 1 below shows statistics of data sets used in the experiment for the four methods. It is noted that of the data sets, the data denoted with "*" were not used in the experiments.

TABLE 1

|  | Train | Dev | Test |
|---|---|---|---|
| Quasar-T | 37,012 | 3,000 | 3,000 |
| SearchQA | 99,811 | 13,893 | 27,247 |
| TriviaQA | 87,291 | 11,274 | 10,790* |
| SQuAD v1.1 | 87,599 | 10,570* | NA |

Of these, the data sets of the first to third rows are proposed in Reference A8 listed below, and used for training and evaluation of DS-QA method. The data set of the fourth row is described in Reference A9 listed below, and it was used for training core answer representation generator 910. The data set (SQuAD v1.1) consists of triplets each including a question, an answer and a paragraph including the answer. In the experiment, all of these were used to train core answer representation generator 910.

In the experiment, three known data sets (Quasar-T (Reference A10), SearchQA (Reference A11) and TriviaQA (Reference A12)) were used, and known two methods $R^3$ (Reference A13), OpenQA (Reference A8) and the proposed method (PAIR) of the above-described embodiment were compared. Table 2 shows the results of experiment.

TABLE 2

|  | Quasar-T | | SearchQA | | TriviaQA | |
|---|---|---|---|---|---|---|
|  | EM | F1 | EM | F1 | EM | F1 |
| $R^3$ | 35.3 | 41.7 | 49.0 | 55.3 | 47.3 | 53.7 |
| OpenQA | 42.2 | 49.3 | 58.8 | 64.5 | 48.7 | 56.3 |
| Proposed(PAIR) | 43.2§ | 49.7 | 59.6† | 65.3† | 49.6† | 54.8 |

For all evaluations, EM and F1 scores were used. EM represents the ratio of prediction results that correctly matched one of the real answers (ground truth). F1 broadly indicates average overlap between the prediction results and the real answers. In this table, TriviaQA results correspond to its development data. Symbols § and † represent statistical significance in accordance with McNemar's test under the condition of $p<0.05$ and $p<0.01$, respectively, of the difference in performance between the proposed method (PAIR) and OpenQA.

From these results, it can be seen that when the core answer representation generator 910 in accordance with the above-described embodiment is used, the proposed method of the invention outperformed all other methods, except for F1 in the combination of OpenQA and TriviaQA. Some of the results indicate that the difference in performance is statistically significant.

From the foregoing, it is understood that the core answer representation in accordance with the present invention can be used effectively not only for the why-type question-answering system but also for other question-answering systems, such as what-type question-answering system.

[Computer Implementation]

Figure 23:
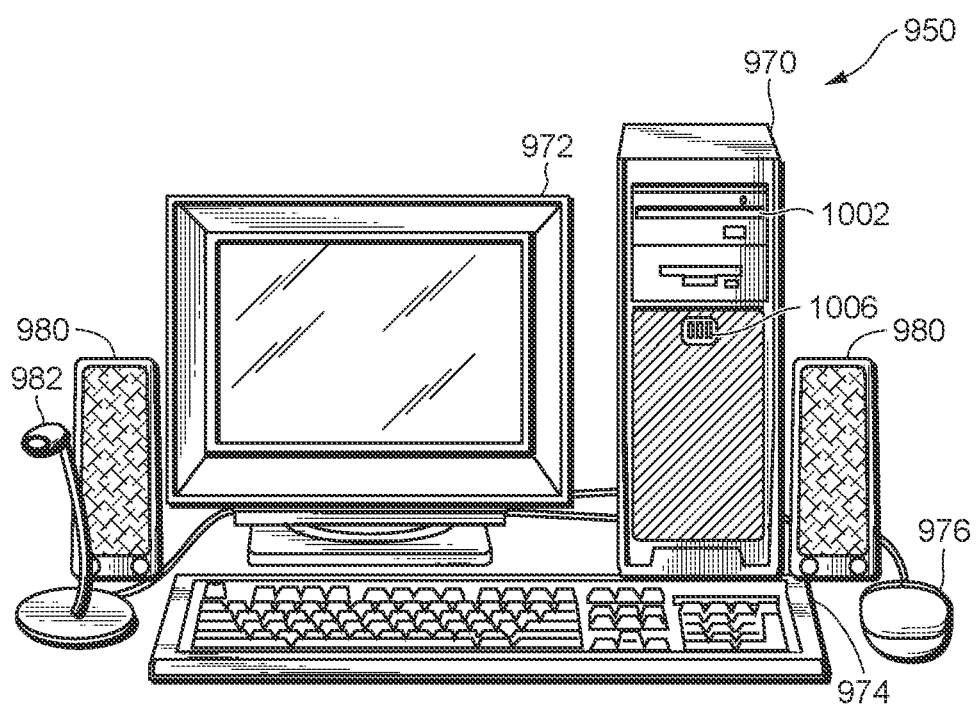
FIG. 23 shows an appearance of a computer system realizing the fake representation generator training system, the fake representation generator and the answer classifier in accordance with various embodiments of the present invention.
Figure 24:
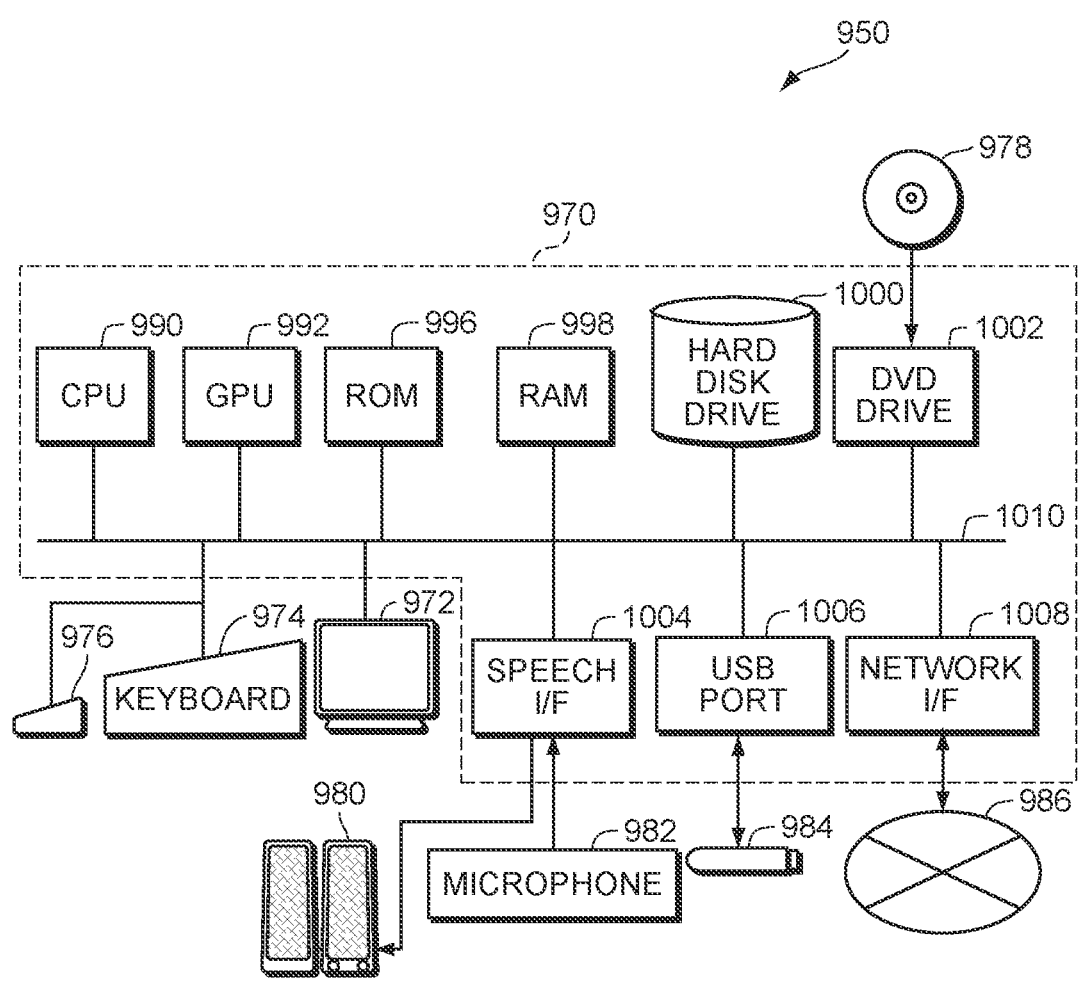
FIG. 24 is a block diagram showing a hardware configuration of the computer system of which appearance is shown in FIG. 23.

FIG. 23 shows an appearance of a computer system realizing each of the above-described embodiments. FIG. 24 is a hardware block diagram of the computer system shown in FIG. 23.

Referring to FIG. 23, the computer system 950 includes: a computer 970 having a DVD (Digital Versatile Disc) drive 1002; and a keyboard 974, a mouse 976 and a monitor 972, all connected to computer 970 for interaction with the user. These are examples of user interaction equipment and any other general hardware and software (for example, a touch-panel, voice input, pointing device and so on) allowing user interaction may be used.

Referring to FIG. 24, computer 970 includes: in addition to DVD drive 1002, a CPU 990, a GPU (Graphics Processing Unit) 992, a bus 1010 connected to CPU 990, GPU 992, and DVD drive 1002, a ROM 996 connected to bus 1010 for storing a boot up programs and the like of computer 970, a RAM 998 connected to bus 1010, for storing instructions forming a program, a system program and work data, and a hard disk drive (HDD) 1000, which is a non-volatile memory connected to bus 1010. Hard disk 1000 is for storing programs executed by CPU 990 and GPU 992, data used by the programs executed by CPU 990 and GPU 992 and so on. Computer 970 further includes: a network I/F 1008 providing connection to a network 986 allowing communication with other terminals; and a USB port 1006 to which a USB memory 984 may be detachably attached, providing communication with USB memory 984 and different units in computer 970.

Computer 970 further includes: a speech I/F 1004 connected to a microphone 982, a speaker 980 and bus 1010, reading out a speech signal generated by CPU 990 and stored in RAM 998 or HDD 1000 under the control of CPU 990, to convert it into an analog signal, amplify it, and drive speaker 980, or digitizing an analog speech signal from microphone 982 and storing it in an addresses in RAM 998 or in HDD 1000 specified by CPU 990.

In the embodiments described above, data and parameters of generators 144 and 196, fake representation generators, 244, 662 and 712, discriminators 148, 200, 248, 666 and 716, text archive 810, core answer representation generator 910, paragraph selecting unit 918 and answer extracting unit 926 shown in FIGS. 6 to 8, 11, 12, 16, 17 and 22 are stored, for example, in HDD 1000, RAM 998, DVD 978 or USB memory 984 shown in FIG. 24, or in a storage medium of an external device, not shown, connected through network I/F 1008 and network 986. Typically, the data and parameters are written from the outside to HDD 1000, for example, and at the time of execution by computer 970, loaded into RAM 998.

Computer programs causing the computer system to operate to realize functions of GAN 220 shown in FIG. 8, the training device for generative adversarial network therefor, and various components thereof are stored in DVD 978 loaded to DVD drive 1002, and transferred from DVD drive 1002 to HDD 1000. Alternatively, USB memory 984 storing the programs is attached to USB port 1006, and the programs may be transferred to hard disk 1000. Alternatively, the programs may be transmitted through network 986 to computer 970 and stored in HDD 1000. At the time of execution, the programs will loaded into RAM 998. Naturally, source programs may be typed using keyboard 974, monitor 972 and mouse 976, and the compiled object programs may be stored in HDD 1000. When a script language is used, scripts input through keyboard 974 or the like may be stored in HDD 1000. For a program operating on a virtual machine, it is necessary to install programs that function as a virtual machine in computer 970 beforehand.

CPU 990 fetches an instruction from RAM 998 at an address indicated by a register therein (not shown) referred to as a program counter, interprets the instruction, reads data necessary to execute the instruction from RAM 998, hard disk 1000 or from other device in accordance with an address specified by the instruction, and executes a process designated by the instruction. CPU 990 stores the resultant data at an address designated by the program, of RAM 998, hard disk 1000, register in CPU 990 and so on. At this time, the value of program counter is also updated by the program. The computer programs may be directly loaded into RAM 998 from DVD 978, USB memory 984 or through the network. Of the programs executed by CPU 990, some tasks (mainly numerical calculation) may be dispatched to GPU 992 by an instruction included in the programs or in accordance with a result of analysis during execution of the instructions by CPU 990.

The programs realizing the functions of various units in accordance with the embodiments above by computer 970 may include a plurality of instructions described and arranged to cause computer 970 to operate to realize these functions. Some of the basic functions necessary to execute the instruction are provided by the operating system (OS) running on computer 970, by third-party programs, or by modules of various tool kits installed in computer 970. Therefore, the programs may not necessarily include all of the functions necessary to realize the system and method in accordance with the present embodiment. The programs have only to include instructions to realize the functions of the above-described various devices or their components by calling appropriate functions or appropriate "program tool kits" in a manner controlled to attain desired results. The operation of computer 970 for this purpose is well known and, therefore, description thereof will not be given here. It is noted that GPU 992 is capable of parallel processing and capable of executing a huge amount of calculation accompanying machine learning simultaneously in parallel or in a pipe-line manner. By way of example, parallel computational element found in the programs during compilation of the programs or parallel computational elements found during execution of the programs may be dispatched as needed from CPU 990 to GPU 992 and executed, and the result is returned to CPU 990 directly or through a prescribed address of RAM 998 and input to a prescribed variable in the program.

[Reference A1]
Jong-Hoon Oh, Kentaro Torisawa, Chikara Hashimoto, Takuya Kawada, Stijn De Saeger, Jun'ichi Kazama, and Yiou Wang. 2012. Why question answering using sentiment analysis and word classes. In Proceedings of EMNLP-CoNLL, pages 368-378.

[Reference A2]
Ryu Iida, Canasai Kruengkrai, Ryo Ishida, Kentaro Torisawa, Jong-Hoon Oh, and Julien Kloetzer. 2019. Exploiting background knowledge in compact answer generation for why-questions. In Proceedings of Thirty-Third AAAI Conference on Artificial Intelligence 2019 (AAAI-19).

[Reference A3]
Jong-Hoon Oh, Kentaro Torisawa, Canasai Kruengkrai, Ryu Iida, and Julien Kloetzer. 2017. Multi-column convolutional neural networks with causality-attention for why-question answering. In Proceedings of WSDM.

[Reference A4]
Jacob Devlin, Ming-Wei Chang, Kenton Lee, and Kristina Toutanova. 2018. BERT: pre-training of deep bidirectional transformers for language understanding. CoRR, abs/1810.04805.

[Reference A5]
Danqi Chen, Adam Fisch, Jason Weston, and Antoine Bordes. 2017. Reading Wikipedia to answer opendomain questions. In Association for Computational Linguistics (ACL).

[Reference A6]
Dzmitry Bahdanau, Kyunghyun Cho, and Yoshua Bengio. 2015. Neural machine translation by jointly learning to align and translate. In Proceedings of ICLR.

[Reference A7]
Ilya Sutskever, Joshua B. Tenenbaum, and Ruslan R Salakhutdinov. 2009. Modelling relational data using bayesian clustered tensor factorization. In Proceedings of NIPS.

[Reference A8]
Yankai Lin, Haozhe Ji, Zhiyuan Liu, and Maosong Sun. 864 2018. Denoising distantly supervised open-domain question answering. In Proceedings of the 56th Annual Meeting of the Association for Computational Linguistics, ACL 2018, pages 1736-1745.

[Reference A9]
Pranav Rajpurkar, Jian Zhang, Konstantin Lopyrev, and Percy Liang. 2016. Squad: 100,000+ questions for machine comprehension of text. In Proceedings of the 2016 Conference on Empirical Methods in Natural Language Processing, pages 2383-2392.

[Reference A10]
Bhuwan Dhingra, Kathryn Mazaitis, and William W Cohen. 2017. Quasar: Datasets for question answering by search and reading. arXiv preprint arXiv:1707.03904.

[Reference A11]
Matthew Dunn, Levent Sagun, Mike Higgins, V. Ugur Gueney, Volkan Cirik, and Kyunghyun Cho. 2017. Searchqa: A new q&a dataset augmented with context from a search engine. CoRR, abs/1704.05179.

[Reference A12]
Mandar Joshi, Eunsol Choi, Daniel Weld, and Luke Zettlemoyer. 2017. Triviaqa: A large scale distantly supervised challenge dataset for reading comprehension. In Proceedings of the 55th Annual Meeting 851 of the Association for Computational Linguistics, 852 pages 1601-1611.

[Reference A13]
Shuohang Wang, Mo Yu, Xiaoxiao Guo, Zhiguo Wang, Tim Klinger, Wei Zhang, Shiyu Chang, Gerry Tesauro, Bowen Zhou, and Jing Jiang. 2018. R3: Reinforced ranker-reader for open-domain question answering. In Proceedings of the Thirty-Second AAAI Conference on Artificial Intelligence, (AAAI-18), pages 5981-5988.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention can be used for building and operating a question-answering system that contributes to problem solving in any field of industry. The present invention is particularly useful to improve structures and operations of industrially used machines, as well as to improve efficiency of processes and methods.

REFERENCE SIGNS LIST 30 why-type question-answering system
32, 66, 90, 191, 442, 760, 812 question
34 answer candidate retrieving system
800, 900 question-answering system
36, 774, 824, 872, 928 answer
50 question receiving unit
52 response receiving unit
54 answer passage storage unit
56 web archive storage unit 58 causality expression extracting unit
60 feature extracting unit
62, 512 CNN
64 answer candidate ranking unit
92, 100 answer passage
94 expression
110, 194 core answer
130, 180, 220, 650, 700 GAN
140 real data
142 noise
144, 196 generator
146 fake data
148, 200, 248, 666, 716 discriminator
150, 202, 250, 668, 718 discrimination result
190, 440, 764 passage
192 core answer generation
198 fake core answer
240 real representation generator
242 real representation
244, 662, 712, 860 fake representation generator
246, 664, 714, 862 fake representation
300, 304, 306, 308, 350, 351, 352, 354, 356 step
420 classifier
444 core answer representation vector
446 core answer representation
448 passage encoder
450 passage representation vector
452 passage representation
454 question encoder
456 question representation vector
458 question representation
460 logistic regression layer
462 classification result
500, 504 word embedding layer
502, 506, 510 word vector sequence
508 attention adding unit
550, 552, 554,558, 600, 602, 604 result
660 random vector
710 random passage
750, 850 task
762 search
766, 864 paragraph selector
768, 816, 866 set of paragraphs
770, 868 paragraph reader
772, 820, 870, 920 set of answer candidates
810 text archive
814 paragraph retrieving unit
818, 918 paragraph selecting unit
822, 926 answer extracting unit
910 core answer representation generator
912 set of core answer representations
914, 922 pairing unit
916 set of paragraph-core answer representation pairs
924 set of answer candidate-core answer representation pairs

The invention claimed is:

1. An answer classifier, comprising: a representation generator trained by a computer program configured to cause a computer to operate as:

a first representation generator, upon receiving a question in natural language and an input forming a pair with the question, outputting a first representation vector representing the input;

a second representation generator, upon receiving the question and an answer to the question, outputting a second representation vector representing said answer in a format same as said first representation vector;

a discriminator responsive to said first representation vector or said second representation vector received at an input for determining whether an input representation vector is the first representation vector or the second representation vector; and a generative adversarial network unit for training said discriminator and said first representation generator by said generative adversarial network unit such that error determination of said first representation vector is maximized and error determination of said second representation vector is minimized, the representation generator responsive to receipt of a question and a passage including an answer to the question at an input, for outputting a first representation vector obtained from the passage, representing an answer to said question, wherein the answer classifier further comprises:

a passage encoder responsive to receipt of said passage, said first representation vector and said question at an input, for outputting a representation vector encoding said passage, having an attention by said first representation vector and said question added;

a question encoder responsive to receipt of said question and said passage, for outputting a representation vector of said question having an attention by said passage added; and a determiner trained beforehand such that upon receiving said first representation vector, the representation vector of said passage and the representation vector of said question, said determiner classifies said passage as a correct answer or an erroneous answer to said question.

2. The computer program according to claim 1, wherein said first representation generator includes a vector outputting means responsive to receipt of said question and a passage including one or more sentences including an answer to the question, for outputting said first representation vector representing said answer to said question from said passage.

3. The computer program according to claim 1, wherein said first representation generator includes a vector outputting means responsive to receipt of said question and a passage including one or more sentences selected at random for outputting said first representation vector representing said answer to said question from said passage and said question.

4. The computer program according to claim 1, wherein said first representation generator includes a vector outputting means responsive to receipt of said question and a random vector consisting of random elements for outputting said first representation vector representing said answer to said question from said random vector and said question.

5. A representation generator trained by the computer program according to claim 1.

* * * * *